(12) United States Patent
Tanaka et al.

(10) Patent No.: US 11,151,148 B2
(45) Date of Patent: Oct. 19, 2021

(54) SEARCH APPARATUS AND NON-TRANSITORY COMPUTER READABLE MEDIUM STORING SEARCH PROGRAM

(71) Applicant: FUJIFILM Business Innovation Corp., Tokyo (JP)

(72) Inventors: Eiichi Tanaka, Kanagawa (JP); Yukari Motosugi, Kanagawa (JP); Tadafumi Kawaguchi, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 253 days.

(21) Appl. No.: 16/392,585

(22) Filed: Apr. 23, 2019

(65) Prior Publication Data

US 2020/0201849 A1 Jun. 25, 2020

(30) Foreign Application Priority Data

Dec. 21, 2018 (JP) .............................. JP2018-240073

(51) Int. Cl.
*G06F 16/248* (2019.01)
*G06F 3/0482* (2013.01)

(52) U.S. Cl.
CPC .......... *G06F 16/248* (2019.01); *G06F 3/0482* (2013.01)

(58) Field of Classification Search
CPC .. G06F 3/0482; G06F 16/248; G06F 16/3322; G06F 16/2425; G06F 16/90324
USPC ....................................................... 707/722
See application file for complete search history.

(56) References Cited

U.S. PATENT DOCUMENTS

2006/0248078 A1\* 11/2006 Gross .................. G06F 16/3322

FOREIGN PATENT DOCUMENTS

| JP | 2001005820 | 1/2001 |
| JP | 2009059140 | 3/2009 |
| JP | 4962967 | 6/2012 |

\* cited by examiner

*Primary Examiner* — Hung T Vy
(74) *Attorney, Agent, or Firm* — JCIPRNET

(57) ABSTRACT

A search apparatus includes a first control unit that, in a case of displaying a search result of content information searched with a selected search word, performs control such that recommended words corresponding to the search word are displayed; a second control unit that, in a case of displaying a search result of content information searched by adding a selected recommended word, which is selected from the recommended words, as a search word, performs control such that the selected recommended word is displayed in a search word display region at which the search words are displayed, and the recommended words corresponding to the selected search word and the added search word are displayed; a reception unit that receives a stored search word, out of the selected search word and the added search word, the stored search word being displayed in a storage state indicating that the stored search word is not used for search of the content information but is capable of being reselected; and a third control unit that, in a case where the reception unit receives the stored search word, performs control such that the stored search word is displayed in the storage state, and the recommended words corresponding to search words other than the stored search word are displayed.

21 Claims, 23 Drawing Sheets

| SEARCH WORD | STATE |
|---|---|
| ARTIFICIAL INTELLIGENCE | IN USE |
| CASE-BASED REASONING | STORAGE |
| NATURAL LANGUAGE PROCESSING | IN USE |
| MACHINE TRANSLATION | IN USE |
| AUTOMATIC TRANSLATION | NEGATIVE |
| : | : |

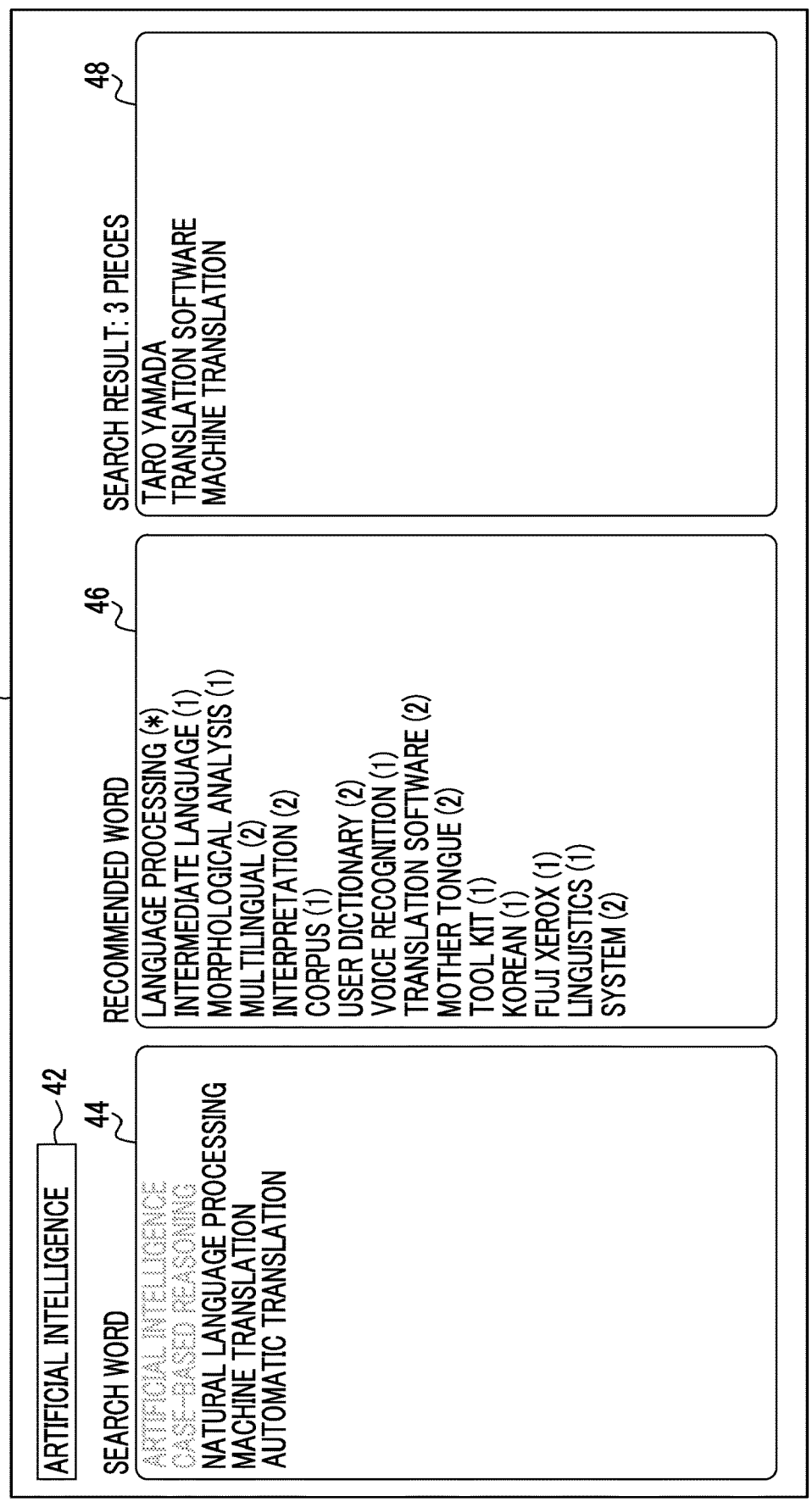

SEARCH APPARATUS AND NON-TRANSITORY COMPUTER READABLE MEDIUM STORING SEARCH PROGRAM

CROSS-REFERENCE TO RELATED APPLICATIONS

This application is based on and claims priority under 35 USC 119 from Japanese Patent Application No. 2018-240073 filed Dec. 21, 2018.

BACKGROUND

(i) Technical Field

The present invention relates to a search apparatus and a non-transitory computer readable medium storing a search program.

(ii) Related Art

JP2001-005820A discloses an information search apparatus including a search execution unit that searches for data according to a search condition input by a user, and a narrowing-down execution unit that presents a question for limiting the search condition and an answer group corresponding to the question to the user as options, in order to further narrow down search result data obtained by the search execution unit, causes the user to select an answer corresponding to the presented question item, from the answer group, and narrows down the search result data, in which the narrowing-down execution unit includes an option storage unit that stores options to be presented to the user, an option extraction unit that extracts an option from the option storage unit, an option display unit that presents the option extracted by the option extraction unit to the user, a selection holding reception unit that receives selection holding of the user with respect to the option presented by the option display unit, and a held option storage unit that stores the option for which selection holding is received by the selection holding reception unit, and the option display unit determines whether or not an option extracted from the option storage unit is a held option, based on contents of the held option storage unit, and presents the extracted option to the user, in a case where the presented option is not a held option.

JP2009-059140A discloses an electronic dictionary including a text input unit that inputs a text in a keyword input field; a keyword candidate display unit that displays a list of keyword candidates corresponding to the text input by the text input unit; a keyword selection unit that selects an arbitrary keyword from the keyword candidates displayed by the keyword candidate display unit; a keyword input unit that inputs the keyword selected by the keyword selection unit, in the keyword input field; a search unit that searches a predetermined database based on one or plural texts input in the keyword input field, each time an input operation is performed on the keyword input field by the text input unit or the keyword input unit; and a search result display unit that displays a search result obtained by the search unit.

JP4962967B discloses a Web page search server in a Web page search system in which a query is input and a Web page is searched, the Web page search server including a word extraction unit that extracts a word which is information on a web page selected by a user from among plural web page candidates presented after execution of the search, and is included in a web page displayed on a screen of a terminal used by the user for the selection; a correlation recording unit that records correlation between the query input for performing the search and the word extracted by the word extraction unit; a recommended query extraction unit that extracts a recommended query, based on the correlation recorded in the correlation recording unit, when the query is input; and a recommended query transmission unit that transmits the recommended query extracted by the recommended query extraction unit to the terminal used by the user.

SUMMARY

Aspects of non-limiting embodiments of the present disclosure relate to a search apparatus and a non-transitory computer readable medium storing a search program, in a case where recommended words corresponding to a search word input by a user are displayed, and content information is searched by adding a recommended word selected from the displayed recommended words by a user as a search word, capable of more easily searching for content information with search words of a new combination including search words used in the past, compared with a case where a user newly inputs a new combination of search words using search words used in the past.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided a search apparatus including a first control unit that, in a case of displaying a search result of content information searched with a selected search word, performs control such that recommended words corresponding to the search word are displayed; a second control unit that, in a case of displaying a search result of content information searched by adding a selected recommended word, which is selected from the recommended words, as a search word, performs control such that the selected recommended word is displayed in a search word display region at which the search words are displayed, and the recommended words corresponding to the selected search word and the added search word are displayed; a reception unit that receives a stored search word, out of the selected search word and the added search word, the stored search word being displayed in a storage state indicating that the stored search word is not used for search of the content information but is capable of being reselected; and a third control unit that, in a case where the reception unit receives the stored search word, performs control such that the stored search word is displayed in the storage state, and the recommended words corresponding to search words other than the stored search word are displayed.

BRIEF DESCRIPTION OF THE DRAWINGS

Exemplary embodiment(s) of the present invention will be described in detail based on the following figures, wherein:

FIG. 12 is a diagram showing an example of a search word table;
FIG. 23 is a diagram showing an example of the search screen.

DETAILED DESCRIPTION

Hereinafter, exemplary embodiments of the present invention will be described in detail with reference to the drawings.

Figure 1:
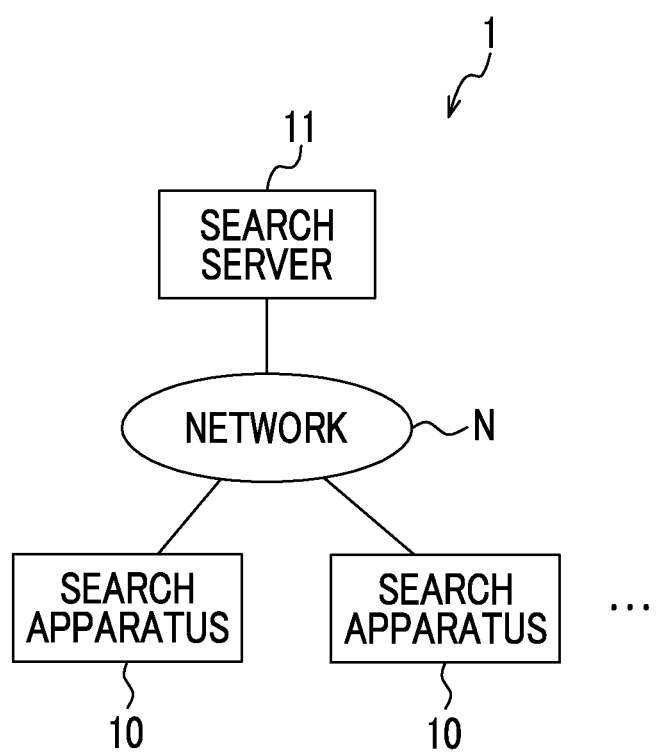
FIG. 1 is a configuration diagram of a search system.

FIG. 1 is a diagram showing a schematic configuration of a search system 1. As shown in FIG. 1, the search system 1 includes a search apparatus 10 and a search server 11. The search apparatus 10 and the search server 11 are connected through a network N such as the Internet, for example.

As will be described later in detail, the search apparatus 10 has a function of receiving a search word for searching content information input by a user and transmitting the received search word to the search server 11, a function of displaying the search result of content information received from the search server 11, and the like.

The search server 11 has a function of searching for content corresponding to the search word transmitted from the search apparatus 10 and transmitting content information on the searched content to the search apparatus 10 as a search result.

The search apparatus 10 is an apparatus including a general computer, and is, for example, a personal computer, a tablet terminal, a smartphone, or the like.

Figure 2:
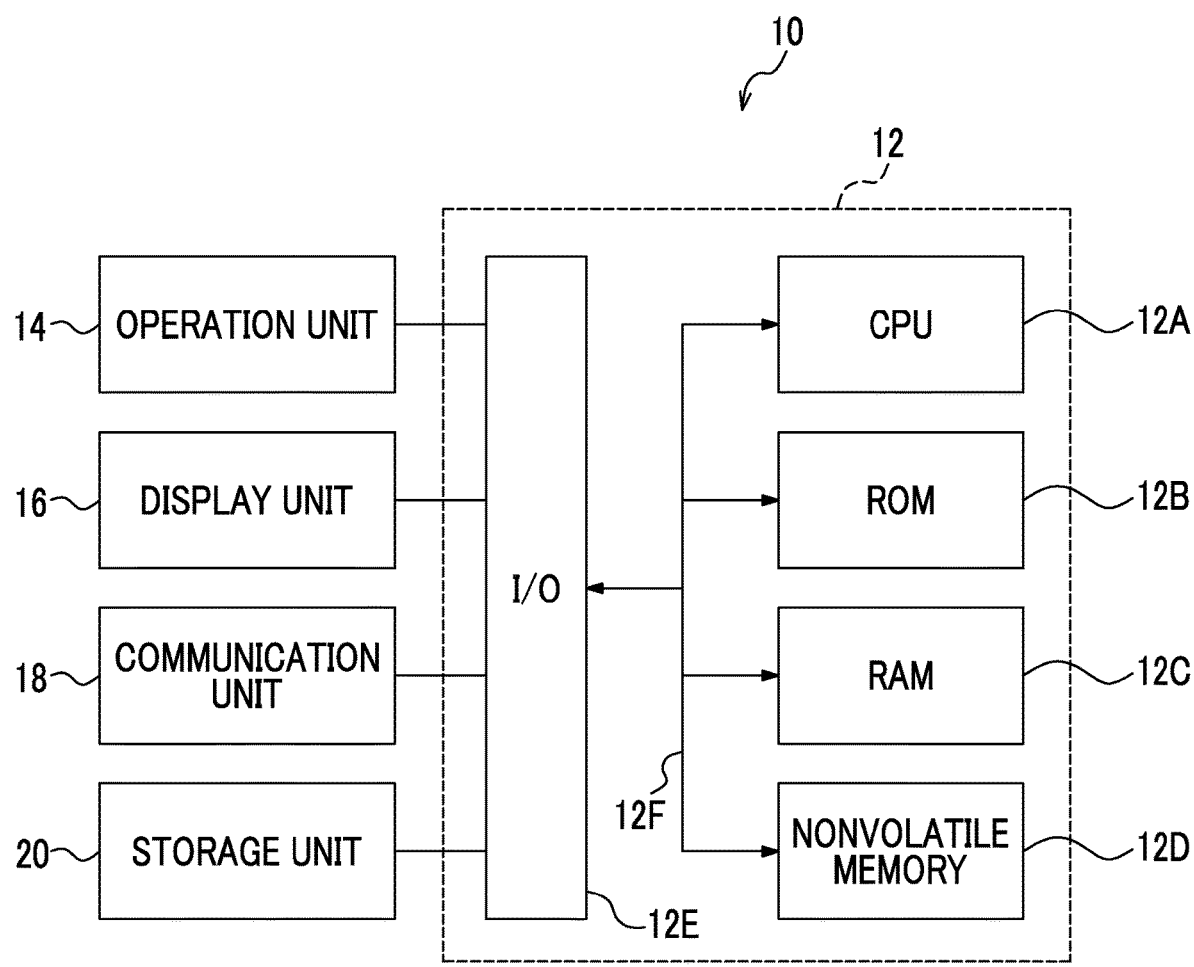
FIG. 2 is a block diagram showing an electrical configuration of a search apparatus.

As shown in FIG. 2, the search apparatus 10 includes a controller 12. The controller 12 includes a central processing unit (CPU) 12A, a read only memory (ROM) 12B, a random access memory (RAM) 12C, a nonvolatile memory 12D, and an input and output interface (I/O) 12E. Then, the CPU 12A, the ROM 12B, the RAM 12C, the nonvolatile memory 12D, and the I/O 12E are connected to each other through a bus 12F.

Further, an operation unit 14, a display unit 16, a communication unit 18, and a storage unit 20 are connected to the I/O 12E.

The operation unit 14 includes, for example, a mouse and a keyboard.

The display unit 16 is, for example, a liquid crystal display or the like.

The communication unit 18 is an interface for performing data communication with an external device such as the search server 11.

The storage unit 20 is a nonvolatile storage device such as a hard disk, and stores a search program and the like to be described later. The CPU 12A reads and executes the search program stored in the storage unit 20.

Next, the functional configuration of the controller 12 will be described.

Figure 3:
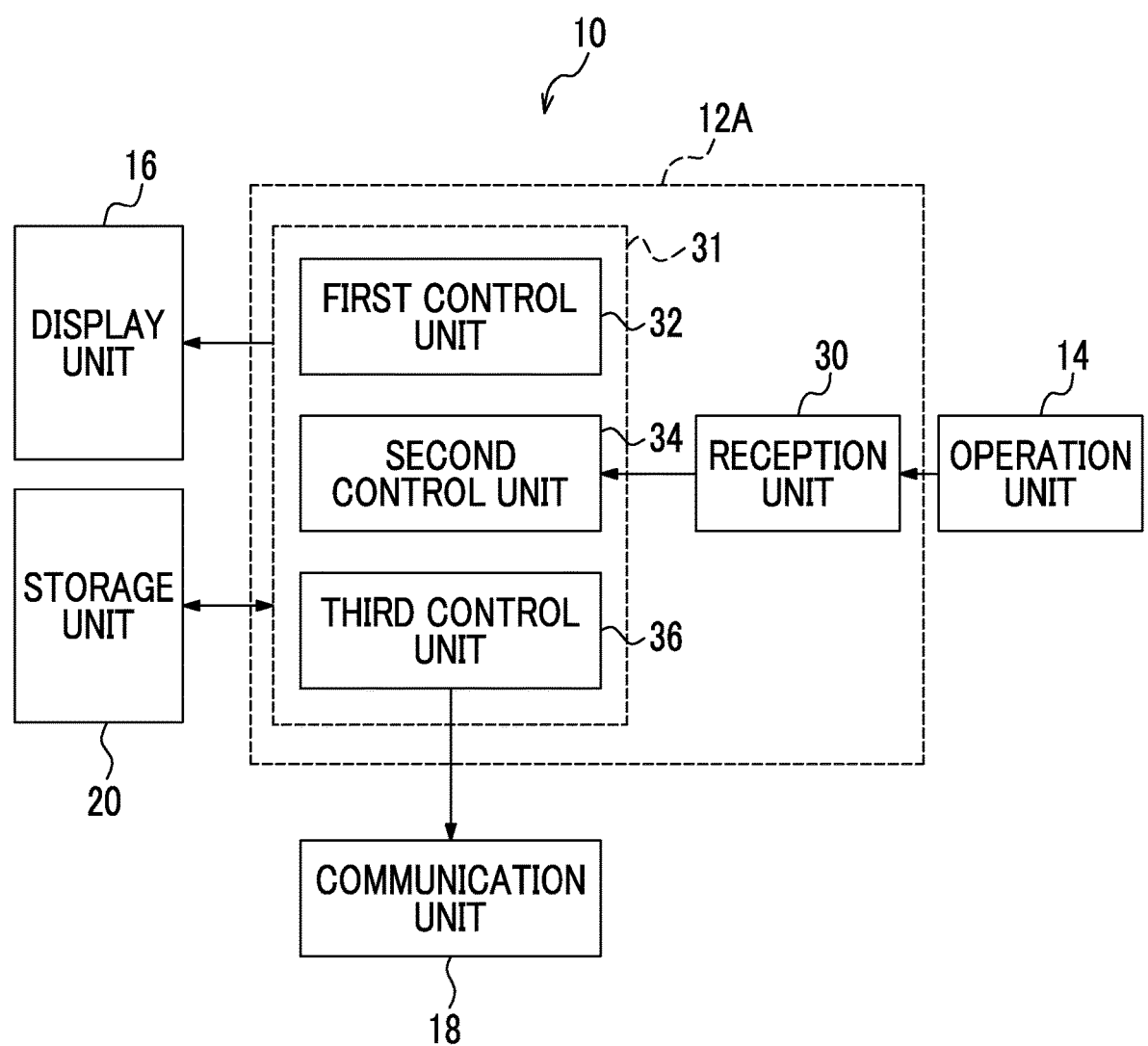
FIG. 3 is a block diagram showing a functional configuration of the search apparatus.

As shown in FIG. 3, the CPU 12A functionally includes a reception unit 30 and a control unit 31. The control unit 31 includes a first control unit 32, a second control unit 34, and a third control unit 36.

The reception unit 30 receives the search word input by the user operating the operation unit 14. Here, in the present exemplary embodiment, the search word is a word for searching content information as an example. It should be noted that not only words but also sentences may be input as search words. Further, the content information is information for accessing the content. Examples of the content include files, Web pages, and the like, but the present invention is not limited thereto.

In a case where the content is a file, the content information is, for example, a file path indicating the storage location of the file, or the like. Further, in a case where the content is a Web page, the content information is, for example, a Uniform Resource Locator (URL). In the present exemplary embodiment, the case where the content is a Web page will be described.

The first control unit 32 displays the search word received by the reception unit 30 on the display unit 16. Further, the first control unit 32 transmits the search word received by the reception unit 30 to the search server 11 through the communication unit 18.

Similar to the search apparatus 10, the search server 11 includes a general computer. Although not shown, the search server 11 includes a database of content information, searches for content information related to the search word transmitted from the search apparatus 10, and transmits the search result to the search apparatus 10. For the search method, various known search methods are used. For example, a full text search (AND search) including all search words is used.

Further, the search server 11 searches for recommended words corresponding to the search word, and transmits the searched recommended words to the search apparatus 10. In addition, various known methods are used as a method of searching for recommended words. For example, as described in JP4962967B, a method of searching words, included in a search subject having a selection history by a user, as a recommended word may be used.

Further, a recommended word may be searched using Latent Semantic Indexing (LSI).

In addition, a recommended word may be searched by using a thesaurus describing the relationship between words in advance.

As described in JP2001-005820A, a recommended word may be searched by using a hierarchical structure index.

Further, a method of searching for a recommended word, based on the distance and similarity between words may be used, such as word 2 vec described in reference 1 below and fastText described in reference 2 below.

(Reference 1) Mikolov, T., Chen, K., Corrado, G., & Dean, J. (2013). Efficient estimation of word representations in vector space. arXiv preprint arXiv:1301.3781.

(Reference 2) Joulin, A., Grave, E., Bojanowski, P., & Mikolov, T. (2016). Bag of tricks for efficient text classification. arXiv preprint arXiv:1607.01759.

In the techniques described in the above References 1 and 2, words are converted into fixed-length real vectors and the similarity sim between the words a and b is calculated by the following expression based on the converted real vectors. Then, words are recommended in the descending order of the calculated similarities.

$$sim(\vec{a}, \vec{b}) = \frac{\vec{a} \cdot \vec{b}}{|\vec{a}||\vec{b}|}$$ [Expression 1]

Further, a recommended word may be searched using an editing distance (Levenshtein distance) generally used as a distance between text strings.

In a case of displaying the search result of the content information searched with the search word selected by the user on the display unit 16, the first control unit 32 performs control such that the recommended word corresponding to the search word is displayed. That is, in a case of receiving the search result and recommended word of the content information from the search server 11, the first control unit 32 displays the received search result and recommended word of the content information on the display unit 16. In a case where a user desires to add a search word, the user selects a desired recommended word from the recommended words displayed on the display unit 16.

In a case where the recommended word is selected by the user, the second control unit 34 transmits the selected recommended word to the search server 11 through the communication unit 18. The search server 11 searches for content information by adding the selected recommended word as a search word to the search word selected by the user, and transmits the search result to the search apparatus 10. Further, the search server 11 searches for a recommended word corresponding to the selected search word and the added search word, and transmits the searched recommended word to the search apparatus 10.

The second control unit 34 displays, on the display unit 16, the search result of the content information searched by adding the selected recommended word selected from recommended words as the search word. In addition, the second control unit 34 performs control such that the selected recommended word is displayed in the search word display region in which the search word is displayed, and the selected search word and the recommended word corresponding to the added search word are displayed.

Further, the reception unit 30 receives a stored search word to be displayed in a storage state which is not used for searching the content information but is in a state that can be reselected, among the selected search word and the added search word.

In a case where the reception unit 30 receives the stored search word, the third control unit 36 performs control such that the stored search word is displayed on the display unit 16 in a storage state, and transmits search words other than the stored search word to the search server 11. The search server 11 searches for content information with a search word other than the stored search word, and transmits the search result to the search apparatus 10. Further, the search server 11 searches for a recommended word corresponding to a search word other than the stored search word, and transmits the searched recommended word to the search apparatus 10. The third control unit 36 performs control such that the search result of content information searched with search words other than the stored search word, and the recommended words corresponding to search words other than the stored search word, which are transmitted from the search server 11, are displayed on the display unit 16.

Figure 4:
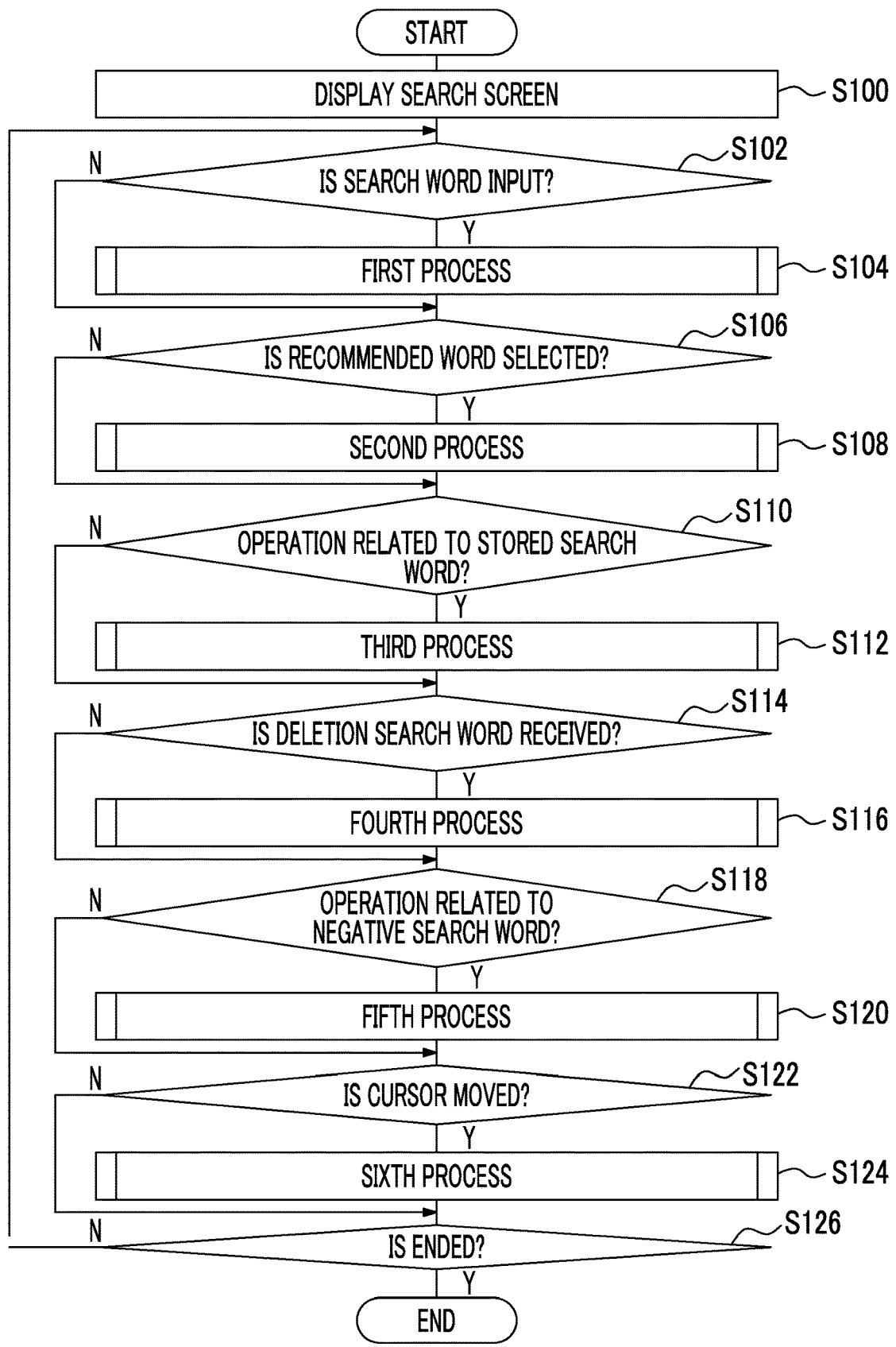
FIG. 4 is a flowchart showing a flow of a search process.

Next, the flow of a search process executed by the CPU 12A of the controller 12 will be described with reference to flowcharts shown in FIGS. 4 to 10. The process shown in FIG. 4 is executed in a case where the user instructs the execution of the search process.

Figure 11:
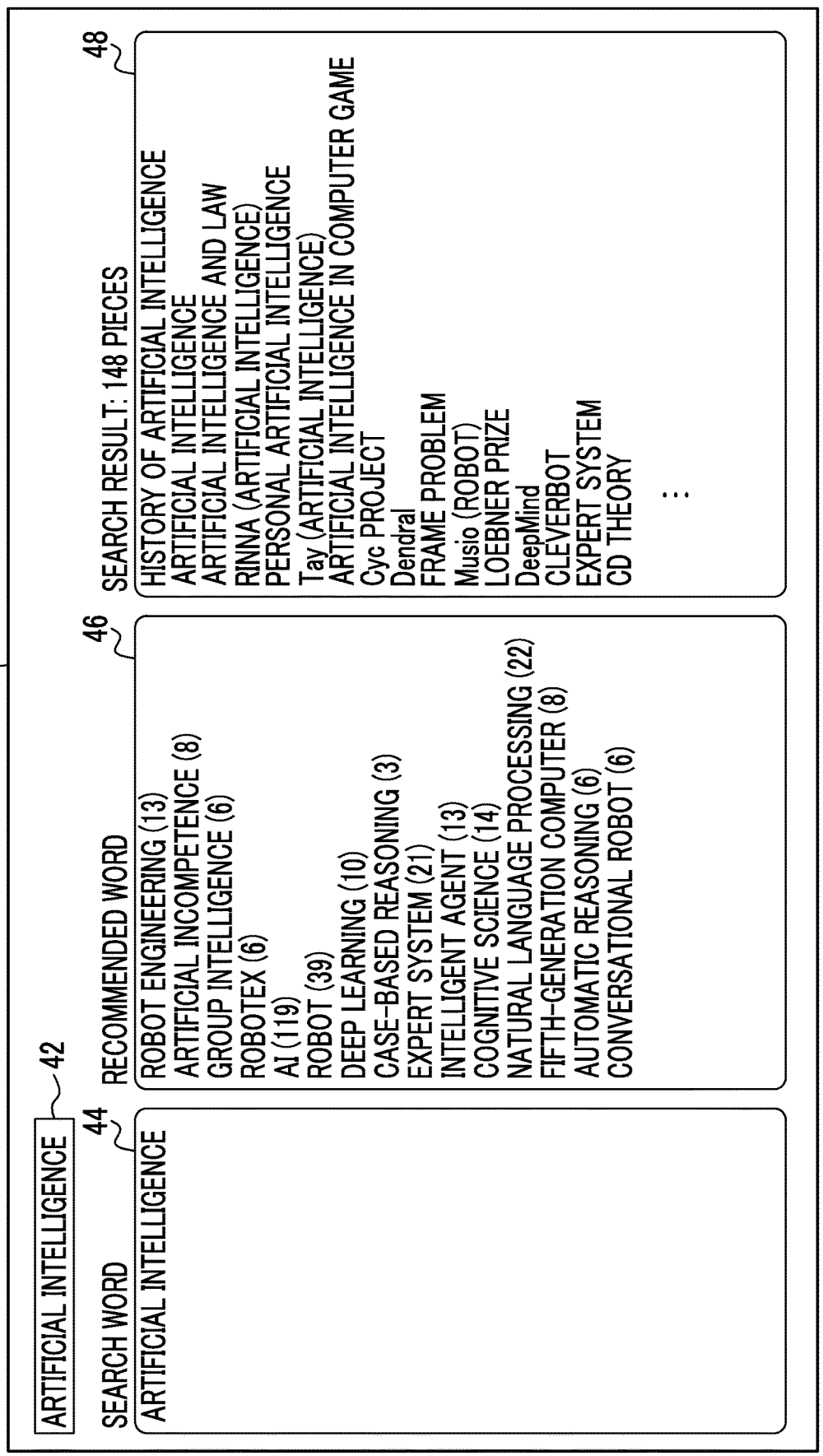
FIG. 11 is a diagram showing an example of a search screen.

In step S100, a search screen 40 shown in FIG. 11 is displayed on the display unit 16. As shown in FIG. 11, the search screen 40 includes a search word input field 42 for inputting a search word, a search word display region 44 for displaying a search word, a recommended word display region 46 for displaying a recommended word, and a search result display region 48 for displaying a search result of content information. In a case of searching the content information, the user inputs an arbitrary search word to the search word input field 42.

In step S102, it is determined whether or not a search word is input in the search word input field 42. In a case where a search word is input in the search word input field 42, the process proceeds to step S104, and in a case where the search word is not input in the search word input field 42, the process proceeds to step S106.

Figure 5:
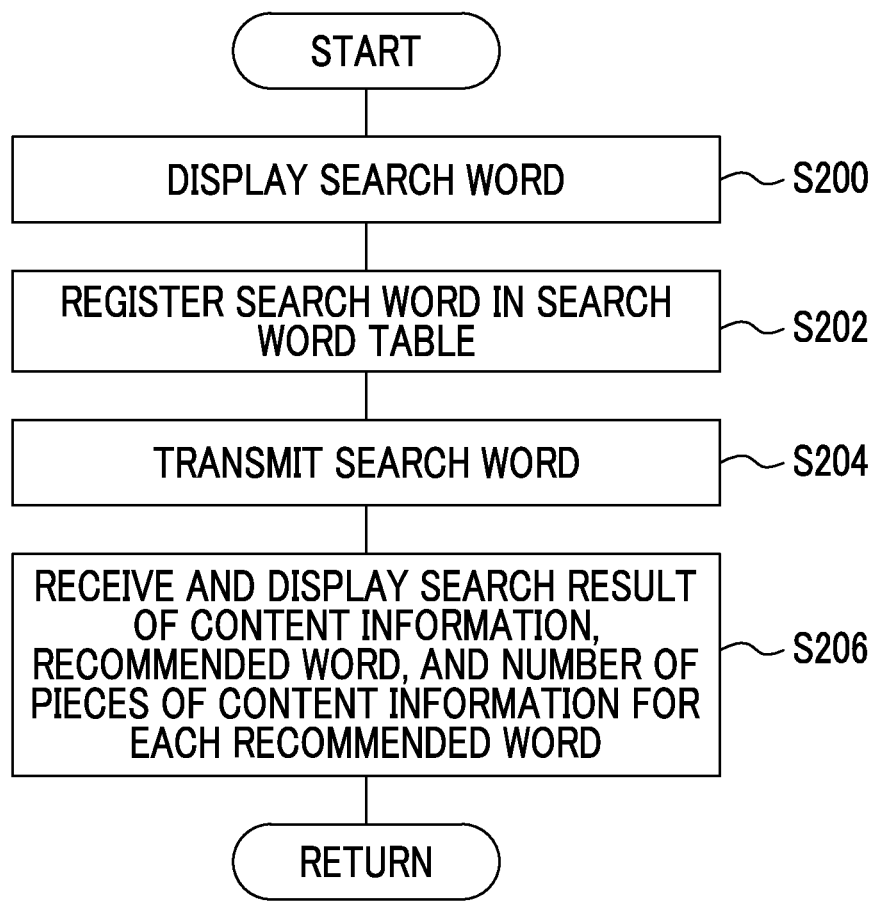
FIG. 5 is a flowchart showing a flow of a first process.

In step S104, a first process shown in FIG. 5 is executed.

As shown in FIG. 5, in step S200, the search word input in the search word input field 42 is displayed in the search word display region 44. For example, as shown in FIG. 11, in a case where "artificial intelligence" is input as a search word in the search word input field 42, a text string of "artificial intelligence" is displayed in the search word display region 44.

In step S202, the search word input in the search word input field 42 is registered in the search table stored in the storage unit 20, for example, in the search word table 50 as shown in FIG. 12. As shown in FIG. 12, the search word table 50 is table data representing the correspondence between search words and the states of the search words. The state of the search word is "in use" in a state where the search word is used for searching the content information. The state is "stored" in a state where the search word is stored. Although details will be described later, the state is "negative" in a case where the search word is a negative search word. The search word table 50 is updated as needed each time a search word is added.

In step S204, the search word input in the search word input field 42 is transmitted to the search server 11. Thus, the search server 11 searches for content information related to the search word transmitted from the search apparatus 10, and transmits the search result to the search apparatus 10, and at the same time, the search server 11 searches for recommended words corresponding to the search word, and transmits the searched recommended words to the search apparatus 10. Further, with respect to each of the recommended words, the search server 11 searches for content information by adding each recommended word as a search word, and transmits the number of pieces of searched content information to the search apparatus 10.

In step S206, the search result of the content information, the recommended word, and the number of pieces of content information for each recommended word in the case of searching for the content information by adding each recommended word as a search word, which are transmitted from the search server 11, are received and displayed on the display unit 16. Thus, as shown in FIG. 11, for example, text strings such as "robot engineering", "artificial incompetence" and the like are displayed as recommended words related to "artificial intelligence" in the recommended word display region 46. In addition, at the end of each recommended word, the number of pieces of content information searched in a case where content information is searched by adding the recommended word as a search word is displayed in parentheses. The number of pieces of content information is a guide for a user to know how much the content information can be narrowed down by selecting which recommended word.

As shown in FIG. 11, in the search result display region 48, the search result of the content information related to the search word "artificial intelligence" is displayed. In the example of FIG. 12, a total of 148 pieces of content information are displayed in addition to the "artificial intelligence history", "artificial intelligence", "artificial intelligence and law" and the like in the search result display region 48. Here, in a case where the user selects, for example, by clicking with a mouse a place where "history of artificial intelligence" is displayed in the search result display region 48, access is made to the URL of the web page of "history of artificial intelligence", and Web page of "deep learning" is displayed on the display unit 16. In a case where the recommended word or the search result cannot be displayed on one screen, the recommended word or the search result may be scroll-displayed by displaying a scroll bar or the like.

In the state shown in FIG. 11, it is difficult to reach a desired content because there are too many search results of content information. Therefore, it is necessary for the user to select a desired recommended word from among the recommended words displayed in the recommended word display region 46, for example by clicking the desired recommended word with the mouse, and further narrow down the search result of the content information.

Therefore, in step S106 of FIG. 4, it is determined whether or not a recommended word is selected from among the recommended words displayed in the recommended word display region 46. In a case where a recommended word is selected, the process proceeds to step S108, and in a case where a recommended word is not selected, the process proceeds to step S110.

Figure 6:
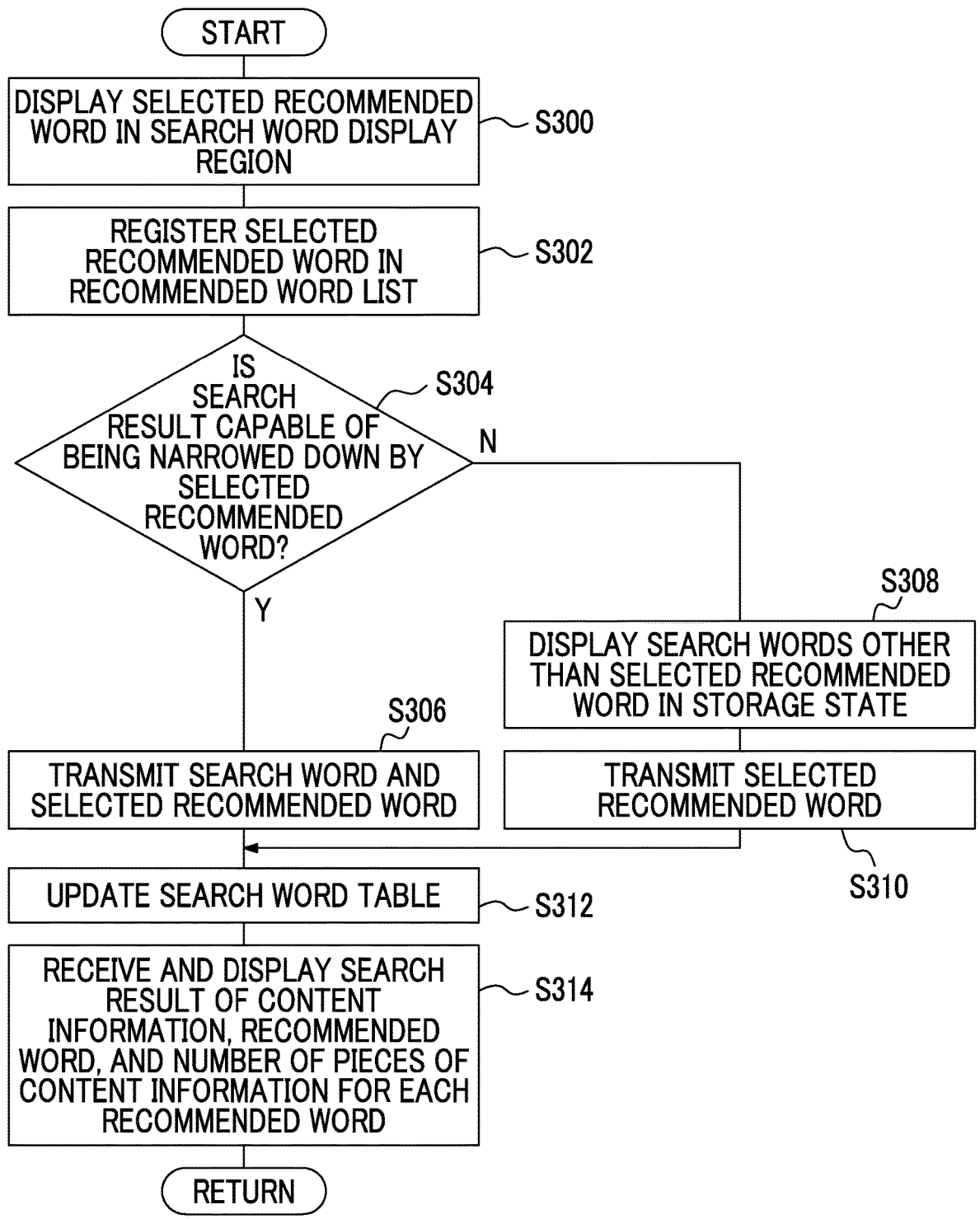
FIG. 6 is a flowchart showing a flow of a second process.

In step S108, the second process shown in FIG. 6 is executed.

Figure 13:
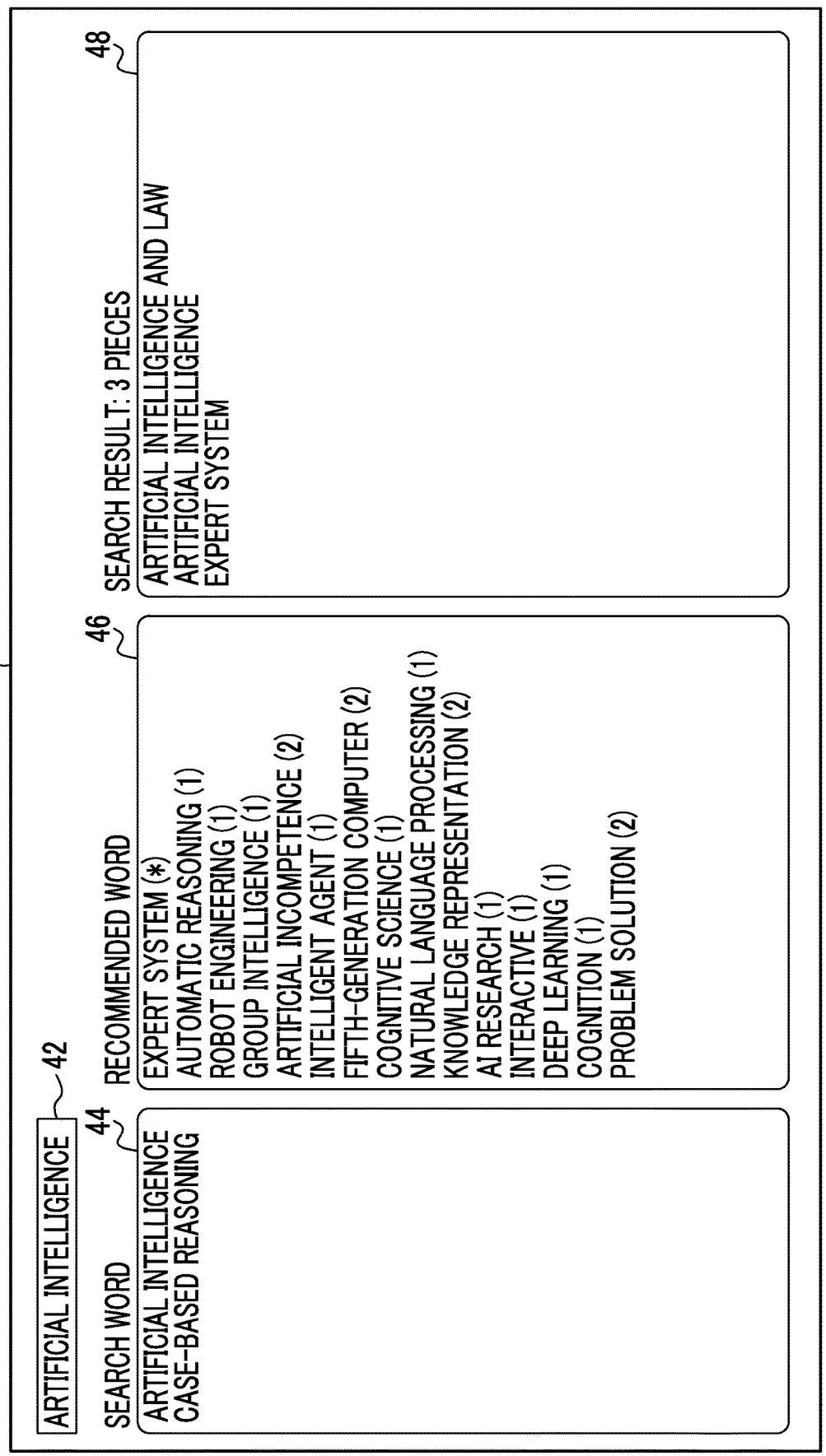
FIG. 13 is a diagram showing an example of the search screen.

As shown in FIG. 6, in step S300, the selected recommended word selected by the user from the recommended word display region 46 is displayed in the search word display region 44, and the selected recommended word is deleted from the recommended word display region 46. For example, in a case where the user selects the recommended word "case-based reasoning" in the recommended word display region 46 on the search screen 40 of FIG. 11, "case-based reasoning" is deleted from the recommended word display region 46 so as to be displayed in the search word display region 44 as shown in FIG. 13.

In addition, the manner in which the selected recommended word moves to the search word display region 44 may be displayed so as to be recognizable. For example, in the case of the example of FIG. 13, a manner in which the selected recommended word "case-based reasoning" moves from the recommended word display region 46 to the search word display region 44 may be displayed by animation. Thus, it is easily recognized that the selected recommended word is added as a search word.

Among the recommended words displayed in the recommended word display region 46, the recommended word with "*" mark instead of a number in parentheses represents a recommended word not included in the search result of the current content information or a recommended word included in all of the search results of the current content information. That is, the recommended word with "*" mark represents a recommended word which is not capable of narrowing down the content information even in a case where the recommended word is selected. For example, in the example of FIG. 13, even in a case of content information is searched with search words to which the recommended word "expert system" with "*" mark is added, the search result of the content information is not changed but maintains 0 or 3.

In step S302, the selected recommended word is registered in the recommended word list stored in the storage unit 20. The recommended word list is a list representing a list of selected recommended words.

In step S304, it is determined whether or not the search result of the content information is capable of being narrowed down by the selected recommended word. That is, it is determined whether or not the selected recommended word is a recommended word with "*" mark. In a case where the selected recommended word is a recommended word capable of narrowing down the search result of the content information, that is, the selected recommended word is not a recommended word with "*" mark but a recommended word on which a number is displayed, the process proceeds to step S306. On the other hand, in a case where the selected recommended word is not a recommended word capable of narrowing down the search result of the content information, that is, the selected recommended word is a recommended word with "*" mark, the process proceeds to step S308.

In step S306, the search word and the selected recommended word are transmitted to the search server 11. Thus, the search server 11 searches for the content information related to the search word and the selected recommended word, transmitted from the search apparatus 10, and transmits the search result to the search apparatus 10, and at the same time, the search server 11 searches for recommended words related to the search word and the selected recommended word, and transmits the searched recommended words to the search apparatus 10. Further, with respect to each of the recommended words, the search server 11 searches for content information by adding each recommended word as a search word, and transmits the number of pieces of searched content information to the search apparatus 10.

In step S312, the search word table 50 is updated. That is, the state of the selected recommended word is registered as "in use" in the search word table 50.

In step S314, the search result of content information, the recommended word, and the number of pieces of content information for each recommended word in the case where content information is searched by adding each recommended word as a search word, which are transmitted from the search server 11, are received and displayed on the display unit 16.

In the example of FIG. 13, as a result of adding the selected recommended word "case-based reasoning" as a search word, as compared with the case where the search word of FIG. 11 is only "artificial intelligence", the number of pieces of searched content information has drastically decreased to three.

On the other hand, in a case where the selected recommended word is a recommended word with "*" mark, in step S308, search words other than the selected recommended word are displayed on the display unit 16 as a stored search word. Here, the stored search word is a search word displayed in a storage state which is not used for searching content information, but is in a state of capable of being reselected.

Figure 14:
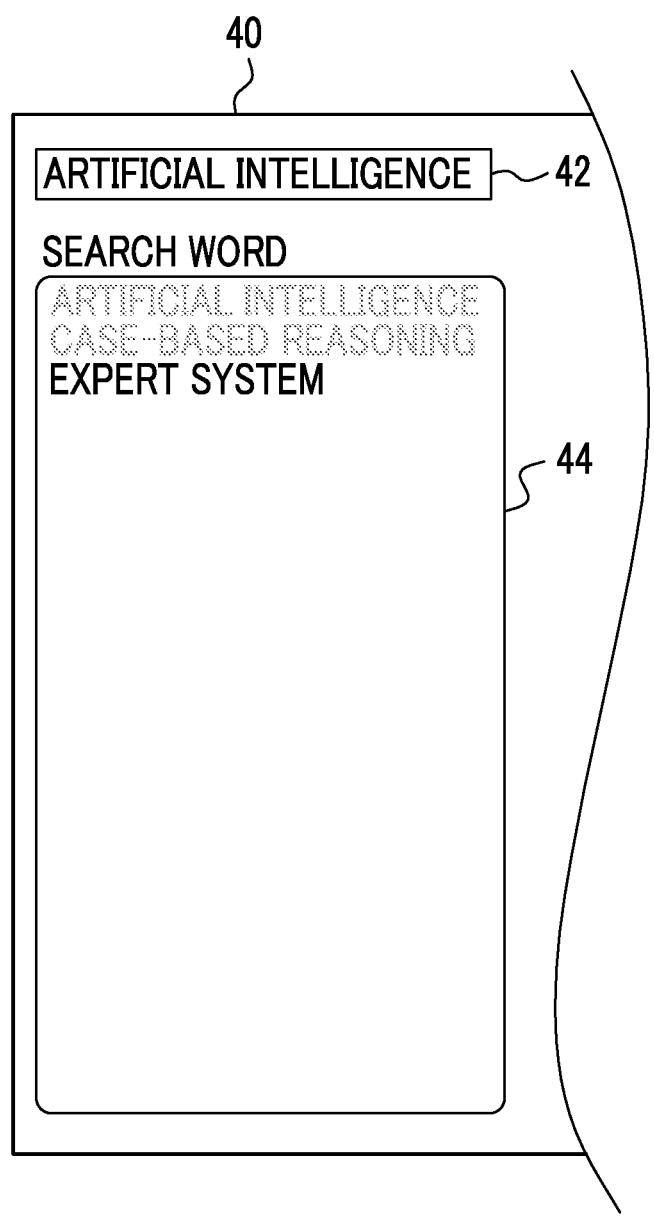
FIG. 14 is a diagram showing an example of the search screen.

For example, in the example of FIG. 13, in a case where the recommended word "expert system" with "*" mark is selected, the search words "artificial intelligence" and "case-based reasoning" other than the selected recommended word "expert system" are the stored search words. In this case, as shown in FIG. 14, the selected recommended word "expert system" is displayed in the search word display region 44 and the search words "artificial intelligence" and "case-based reasoning" other than the selected recommended word "expert system" are displayed in the search word display region 44 in a storage state, for example, in a grayed out state. In addition, the stored search word may be displayed in a color different from the selected recommended word, not limited to the case where the stored search word is displayed in a grayed out state. In addition, the display position of the stored search word and the display position of the search word being in use may be displayed differently to distinguish the display positions from each other. That is, the stored search word may be displayed in a manner different from the search word being in use.

In step S310, the selected recommended word is transmitted to the search server 11. Thus, the search server 11 searches for content information related to the search word, using the selected recommended word transmitted from the search apparatus 10 as a search word, and transmits the search result to the search apparatus 10, and at the same time, the search server 11 searches for recommended words corresponding to the search word, and transmits the searched recommended words to the search apparatus 10. Further, with respect to each of the recommended words, the search server 11 searches for content information by adding each recommended word as a search word, and transmits the number of pieces of searched content information to the search apparatus 10.

In step S312, the search word table 50 is updated. That is, the state of the selected recommended word is registered as "in use" in the search word table 50, and the states of the search words other than the selected recommended word are registered as "stored" in the search word table 50.

In step S314, the search result of the content information, the recommended word, and the number of pieces of content information for each recommended word in the case where content information is searched by adding each recommended word as a search word, which are transmitted from the search server 11, are received and displayed on the display unit 16.

Further, the user may issue an instruction to search content information with search words other than the stored search word, by designating a search word desired to be a stored search word from among the search words displayed in the search word display region 44 by clicking the search word with a mouse.

Therefore, in step S110 of FIG. 4, it is determined whether or not an operation related to the stored search word has been received. In a case where an operation related to the stored search word is received, the process proceeds to step S112, and in a case where the operation related to the stored search word is not received, the process proceeds to step S114. Here, the operation related to the stored search word includes two types of operations: an operation of designating a stored search word from the search words displayed in the search word display region 44, and an operation of releasing the storage state of the stored search word already displayed in the search word display region 44, that is, an operation of reselecting the stored search word as a search word. The operation of reselecting the stored search word is, for example, an operation of pressing a predetermined key of the keyboard and clicking of the mouse at the same time.

Figure 7:
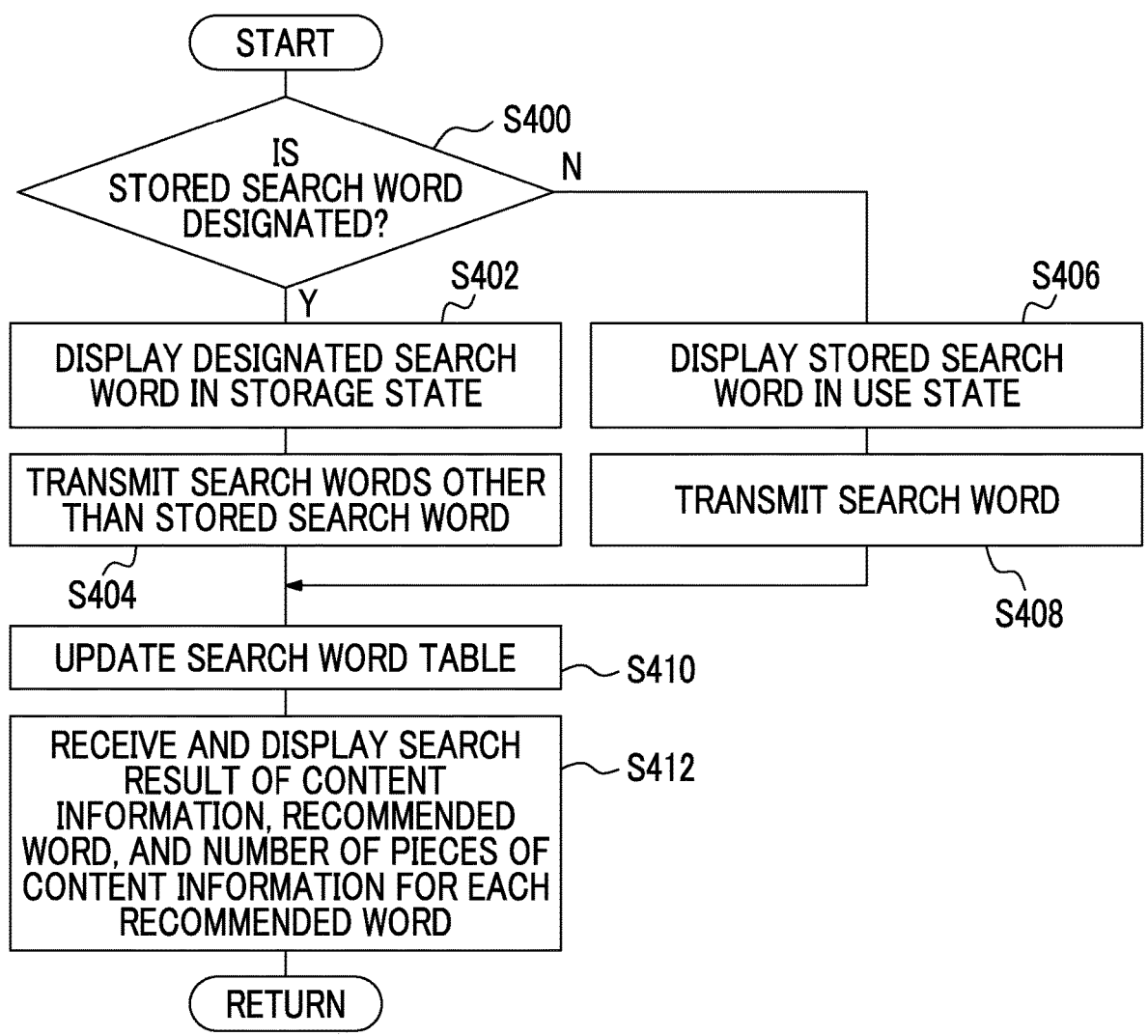
FIG. 7 is a flowchart showing a flow of a third process.

In step S112, the third process shown in FIG. 7 is executed.

As shown in FIG. 7, in step S400, it is determined whether or not the received operation is an operation of designating a stored search word. In a case where the received operation is an operation of designating a stored search word, the process proceeds to step S402. On the other hand, in a case where the received operation is not an operation of designating a stored search word, that is, an operation of reselecting a stored search word, the process proceeds to step S406.

Figure 15:
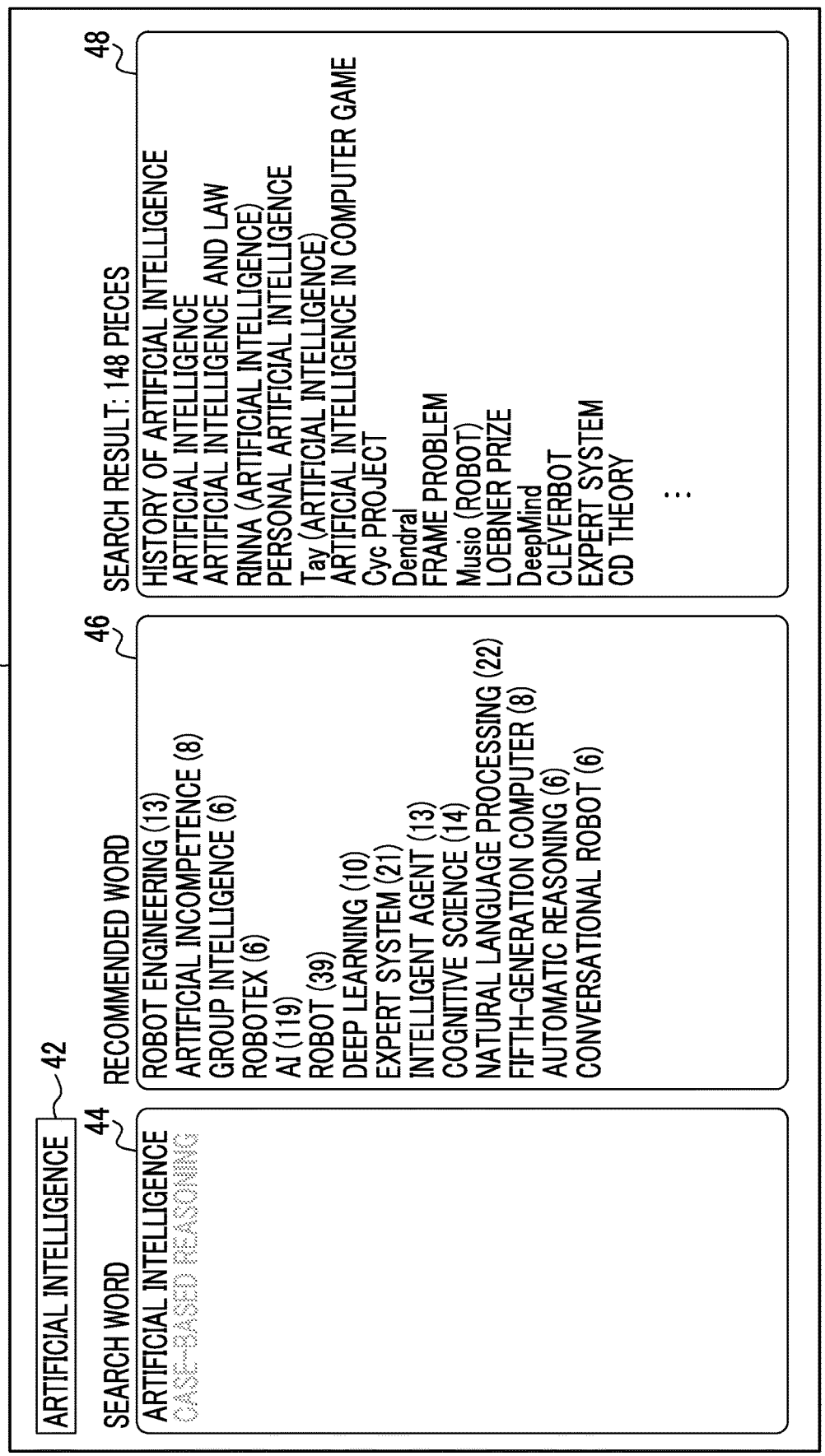
FIG. 15 is a diagram showing an example of the search screen.

In step S402, the designated search word is displayed on the display unit 16 in a storage state. For example, as shown in FIG. 15, in a case where "case-based reasoning" is received as a stored search word, "case-based reasoning" is displayed in a grayed out state. Thus, the user recognizes that "case-based reasoning" is the stored search word.

In step S404, the search words other than the stored search word are transmitted to the search server 11. Thus, the search server 11 searches for the content information related to the search word other than the stored search word, transmitted from the search apparatus 10, and transmits the search result to the search apparatus 10, and at the same time, the search server 11 searches for recommended words corresponding to the search word other than the stored search word, and transmits the searched recommended words to the search apparatus 10. Further, with respect to each of recommended words corresponding to search words other than the stored search word, the search server 11 searches for content information by adding each recommended word as a search word, and transmits the number of pieces of searched content information to the search apparatus 10.

In step S410, the search word table 50 is updated. That is, the state of the search word designated as the stored search word is registered as "stored" in the search word table 50.

In step S412, the search result of content information searched with search words other than the stored search word, the recommended words corresponding to search words other than the stored search word, and the number of pieces of content information for each recommended word in the case where content information is searched by adding the recommended words corresponding to the search words other than the stored search word as search words, transmitted from the search server 11, are received and displayed on the display unit 16. Thus, as shown in FIG. 15, the search result of the content information, the recommended word, and the number of pieces of content information for each recommended word are updated. In the example of FIG. 15, since the content information is searched with the search word "artificial intelligence", the search results of the recommended word and content information are the same as in FIG. 11.

On the other hand, in a case where the received operation is the operation of reselecting the stored search word, in step S406, the reselected stored search word is displayed on the display unit 16 in the use state. For example, in a case where an operation of reselecting the stored search word "case-based reasoning" shown in FIG. 15 is received, the grayed out display of "case-based reasoning" is released and it is displayed in a normal color, for example, black. Thus, the search screen 40 returns to the state shown in FIG. 13.

In step S404, the search word including the reselected search word is transmitted to the search server 11.

In step S410, the search word table 50 is updated. That is, the state of the reselected search word is registered as "in use" in the search word table 50.

In step S412, the search result of content information, the recommended word corresponding to the search word, and the number of pieces of content information for each recommended word in the case where content information is searched by adding the recommended word corresponding to the search word as a search word, transmitted from the search server 11, are received and displayed on the display unit 16. Thus, the search result of the content information, the recommended word, and the number of pieces of content information for each recommended word are updated. That is, it returns from the state shown in FIG. 15 to the state shown in FIG. 13.

Further, the user may designate and delete the deletion search word determined to be unnecessary for searching the content information, from among the search words displayed in the search word display region 44. The operation of designating the deletion search word is, for example, an operation of simultaneously performing an operation of pressing a predetermined key of the keyboard and an operation of clicking the deletion search word with the mouse or the like.

In step S114 of FIG. 4, it is determined whether or not an operation for designating a deletion search word has been received. In a case where the operation of designating the deletion search word is received, the process proceeds to step S116, and in a case where the operation of designating the deletion search word is not received, the process proceeds to step S118.

Figure 8:
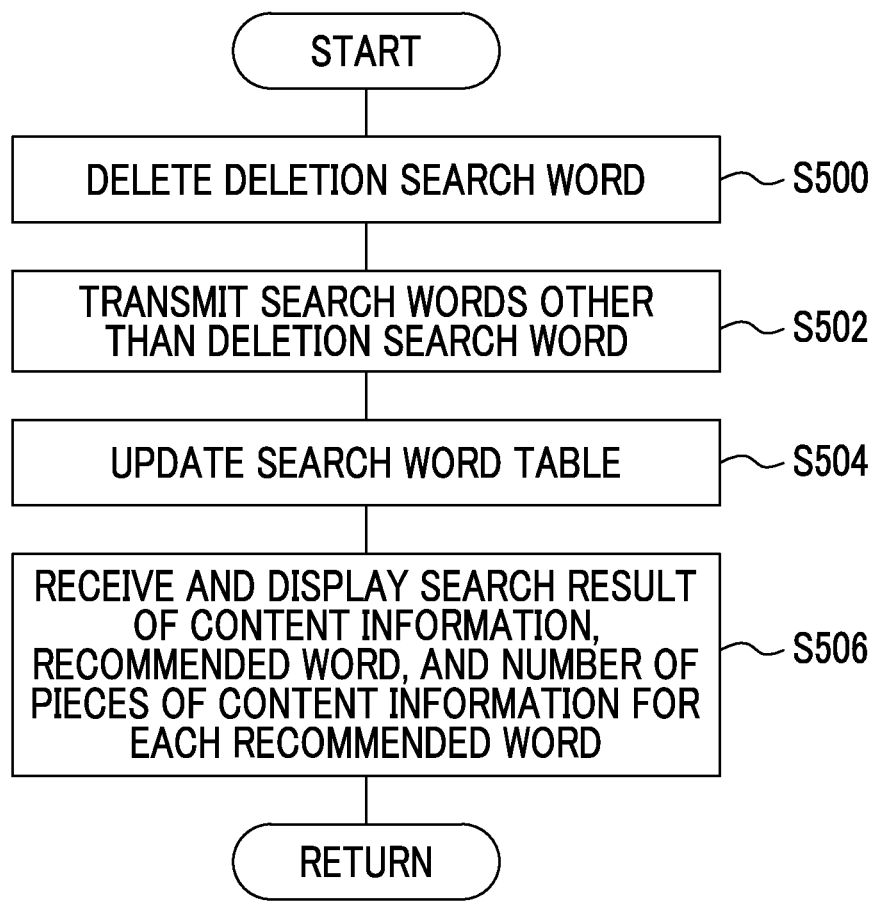
FIG. 8 is a flowchart showing a flow of a fourth process.

In step S116, the fourth process shown in FIG. 8 is executed.

As shown in FIG. 8, in step S500, the received deletion search word is deleted from the search word display region 44.

In step S502, the search words other than the deletion search word are transmitted to the search server 11. Thus, the search server 11 searches for the content information related to the search word other than the deletion search word, transmitted from the search apparatus 10, and transmits the search result to the search apparatus 10, and at the same time, the search server 11 searches for recommended words corresponding to the search word other than the deletion search word, and transmits the searched recommended words to the search apparatus 10. Further, with respect to each of the recommended words corresponding to search words other than the deletion search word, the search server 11 searches for content information by adding the recommended words as search words, and transmits the number of pieces of searched content information to the search apparatus 10.

In step S504, the search word table 50 is updated. That is, the designated deletion search word is deleted from the search word table 50.

In step S506, the search result of content information searched with search words other than the deletion search word, the recommended words corresponding to the search words other than the deletion search word, and the number of pieces of content information for each recommended word in the case where content information is searched by adding the recommended words corresponding to the search words other than the deletion search word as search words, transmitted from the search server 11, are received and displayed on the display unit 16.

Further, the user may select a negative search word from among the search words displayed in the search word display region 44. Here, the negative search word is a search word that is not included in the search result of the content information, that is, a search word that is positively excluded in the search of the content information.

Therefore, in step S118 of FIG. 4, it is determined whether or not an operation related to a negative search word has been received. In a case where the operation related to the negative search word is received, the process proceeds to step S120, and in a case where the operation related to the negative search word is not received, the process proceeds to step S122. Here, the operation related to the negative search word includes two types of operations: an operation of designating a negative search word from among the search words displayed in the search word display region 44, and an operation of releasing the negative state of the negative search word already displayed in the search word display region 44, that is, an operation of reselecting the negative search word as a search word. The operation of designating the negative search word is, for example, an operation of pressing a predetermined key of the keyboard and clicking of the mouse at the same time.

Figure 9:
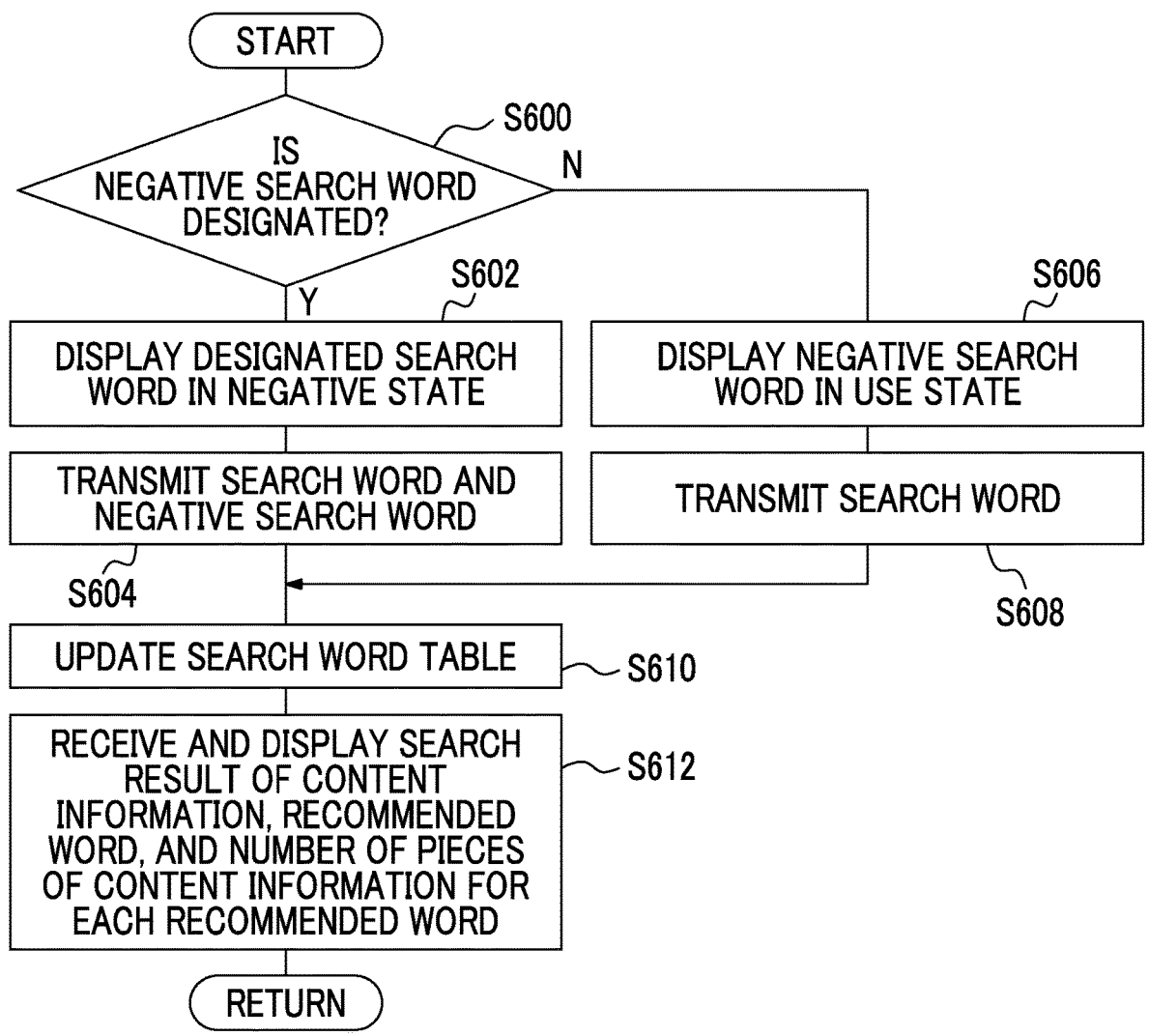
FIG. 9 is a flowchart showing a flow of a fifth process.

In step S120, the fifth process shown in FIG. 9 is executed.

As shown in FIG. 9, in step S600, it is determined whether or not the received operation is an operation of designating a negative search word. In a case where the received operation is an operation of designating a negative search word, the process proceeds to step S602. On the other hand, in a case where the received operation is not an operation of designating a negative search word, that is, an operation of reselecting a negative search word, the process proceeds to step S606.

Figure 16:
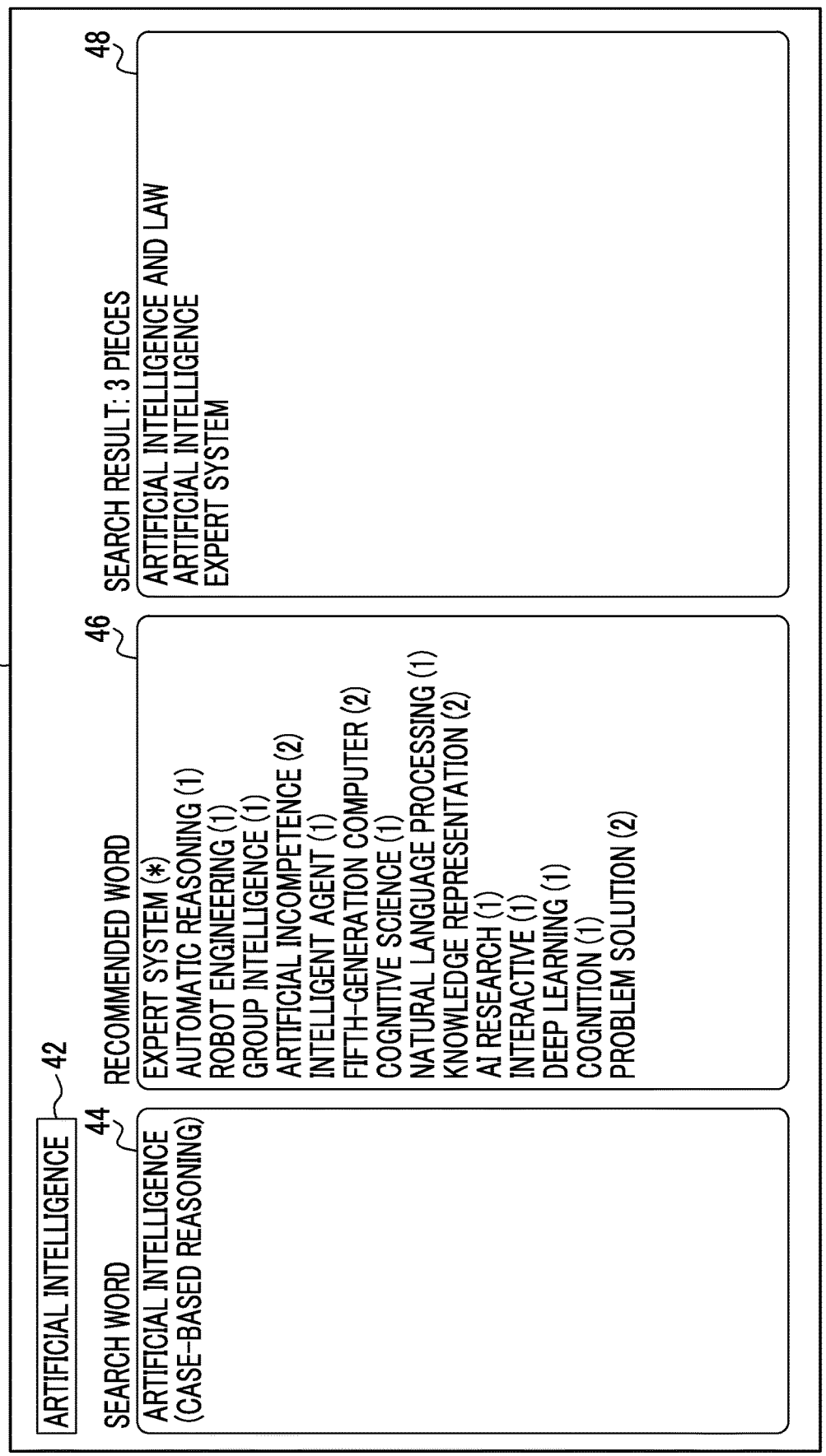
FIG. 16 is a diagram showing an example of the search screen.

In step S602, the designated search word is displayed on the display unit 16 in a negative state. For example, in a case where "case-based reasoning" is received as a negative stored search word in the state of FIG. 13, "case-based reasoning" is displayed in parentheses as shown in FIG. 16. Thus, the user recognizes that "case-based reasoning" is a negative search word. In addition, "case-based reasoning" may be displayed by shading or the like, without being limited to the case of displaying in parentheses. That is, the display of the negative search word may be displayed in a manner distinguished from the display of the stored search word.

In step S604, the search word and the negative search word are transmitted to the search server 11. Thus, the search server 11 searches for the content information related to the search word but not related to the negative search word, transmitted from the search apparatus 10, and transmits the search result to the search apparatus 10, and at the same time, the search server 11 searches for recommended words corresponding to the search word but not corresponding to the negative search word, and transmits the searched recommended words to the search apparatus 10. Further, with respect to each of the searched recommended words, the search server 11 searches for content information by adding each recommended word as a search word, and transmits the number of pieces of searched content information to the search apparatus 10.

In step S610, the search word table 50 is updated. That is, the state of the search word designated as the negative search word is registered as "negative" in the search word table 50.

In step S612, the search result of content information related to the search word but not related to the negative search word, the recommended word corresponding to the search word but not corresponding to the negative search word, and the number of pieces of content information for each recommended word in the case where content information is searched by adding the recommended word as search words, transmitted from the search server 11, are received and displayed on the display unit 16.

On the other hand, in a case where the received operation is the operation of reselecting a negative search word, in step S606, the reselected negative search word is displayed on the display unit 16 in the use state.

In step S608, the search word including the reselected search word is transmitted to the search server 11.

In step S610, the search word table 50 is updated. That is, the state of the reselected search word is registered as "in use" in the search word table 50.

In step S612, the search result of content information, the recommended word corresponding to the search word, and the number of pieces of content information for each recommended word in the case where content information is searched by adding the recommended word corresponding to the search word as a search word, transmitted from the search server 11, are received and displayed on the display unit 16.

Returning to FIG. 4, in step S122, it is determined whether or not the movement of the cursor of the mouse is detected. In a case where the movement of the cursor of the mouse is detected, the process proceeds to step S124, and in a case where the movement of the cursor of the mouse is not detected, the process proceeds to step S126.

Figure 10:
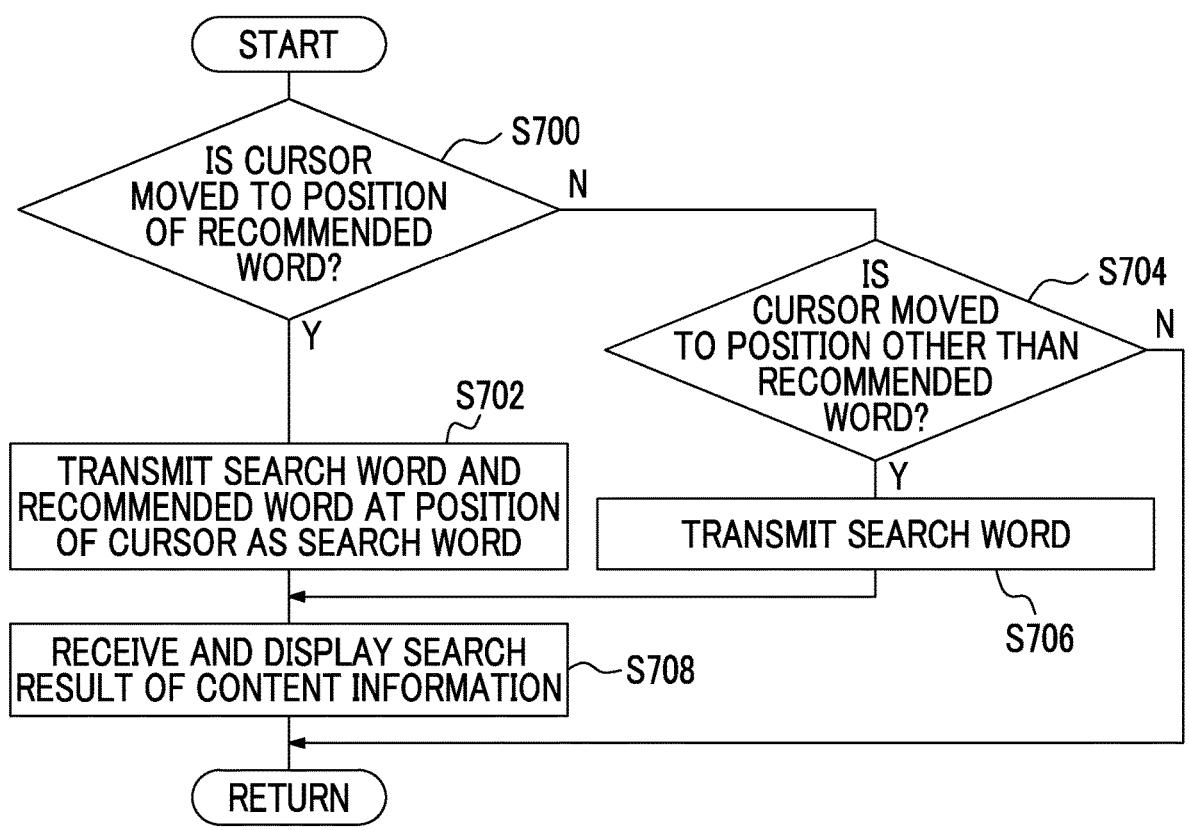
FIG. 10 is a flowchart showing a flow of a sixth process.

In step S124, the sixth process shown in FIG. 10 is executed.

Figure 17:
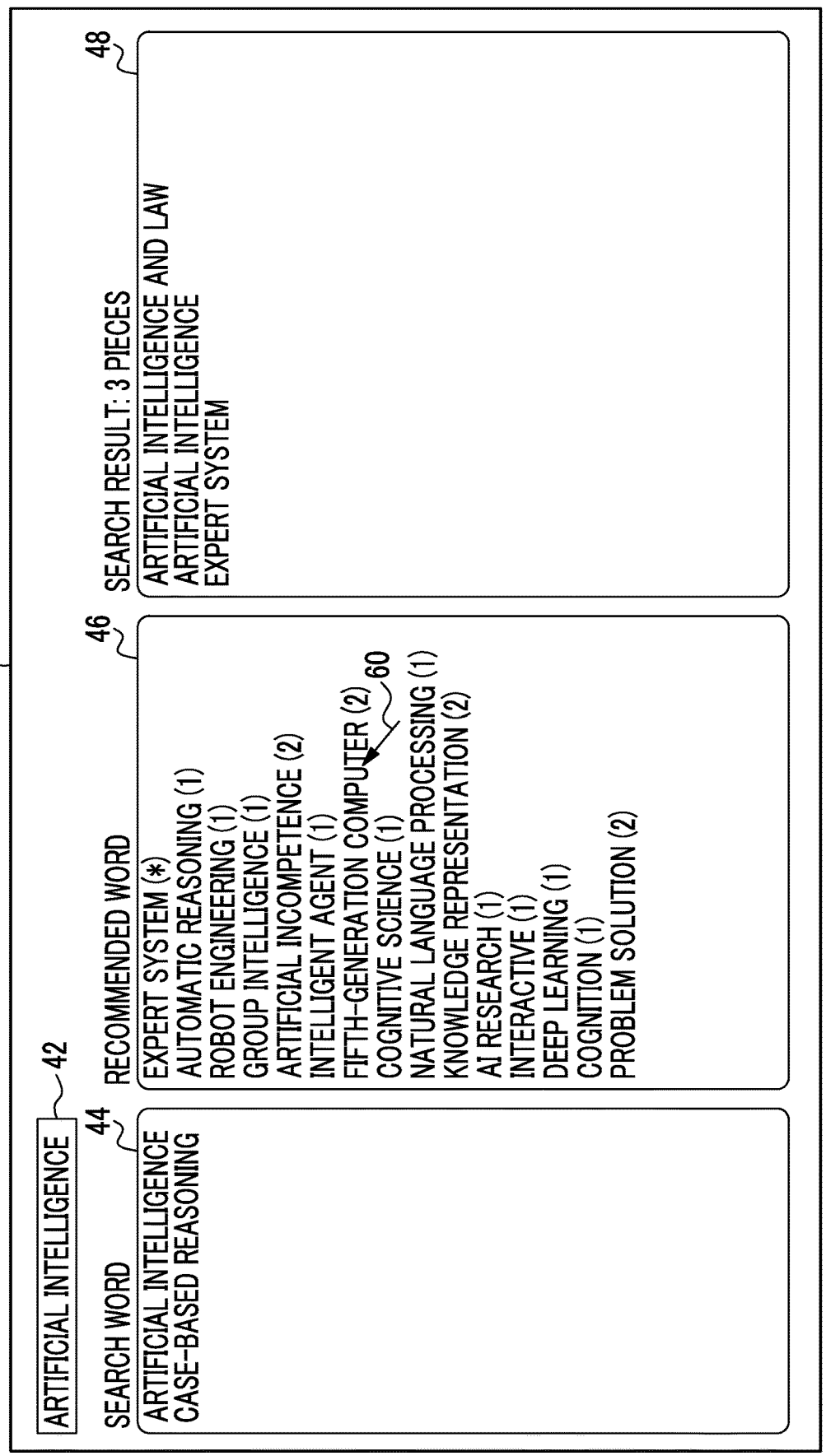
FIG. 17 is a diagram showing an example of the search screen.

As shown in FIG. 10, in step S700, it is determined whether or not the cursor has moved from the position other than the recommended word to the position of the recommended word, that is, whether or not the cursor has moved to the position indicating the recommended word. Specifically, as shown in FIG. 17, for example, by determining whether or not the tip of the cursor 60 has moved to a position indicating the region including the text string of the recommended word, it is determined whether or not the cursor 60 has moved to the position of the recommended word. In the example of FIG. 17, the cursor 60 indicates the recommended word "fifth generation computer".

In a case where the cursor has moved to the position of the recommended word, the process moves to step S702, and in a case where the cursor has not moved to the position of the recommended word, the process moves to step S704.

In step S702, a recommended word at the position where the cursor is present is added to the search word displayed in the search word display region 44 as a search word and transmitted to the search server 11. Thus, the search server 11 searches for the content information using the search word transmitted from the search apparatus 10 and the recommended word at the position where the cursor is present as a search word, and transmits the search result to the search apparatus 10.

In step S708, the search result of the content information transmitted from the search server 11 is received and displayed on the display unit 16. Thereby, even in a case where the recommended word is not selected, the search result of the content information is updated only by moving the cursor to the position of the recommended word. Note that during a period when the cursor is located in a certain recommended word, the recommended word in which the cursor is located may be displayed in the search word display region 44. Thus, the user recognizes that the recommended word at which the cursor is positioned is temporarily added as a search word.

On the other hand, in step S704, it is determined whether or not the cursor is moved to a position other than the recommended word from the position of the recommended word. In a case where the cursor has moved from a position of the recommended word to a position other than the recommended word, the process proceeds to step S706, and in a case where the cursor has not moved from a position of the recommended word to a position other than the recommended word, the process proceeds to step S126 in FIG. 4.

In step S706, the search word displayed in the search word display region 44 is transmitted to the search server 11.

In step S708, the search result of the content information transmitted from the search server 11 is received, and displayed on the display unit 16.

In step S126 of FIG. 4, it is determined whether or not the end of the search process has been instructed, and in a case where the end of the search process is instructed, this routine is ended. On the other hand, in a case where the end of the search process is not instructed, the process returns to step S102 and the above process is repeated.

Figure 18:
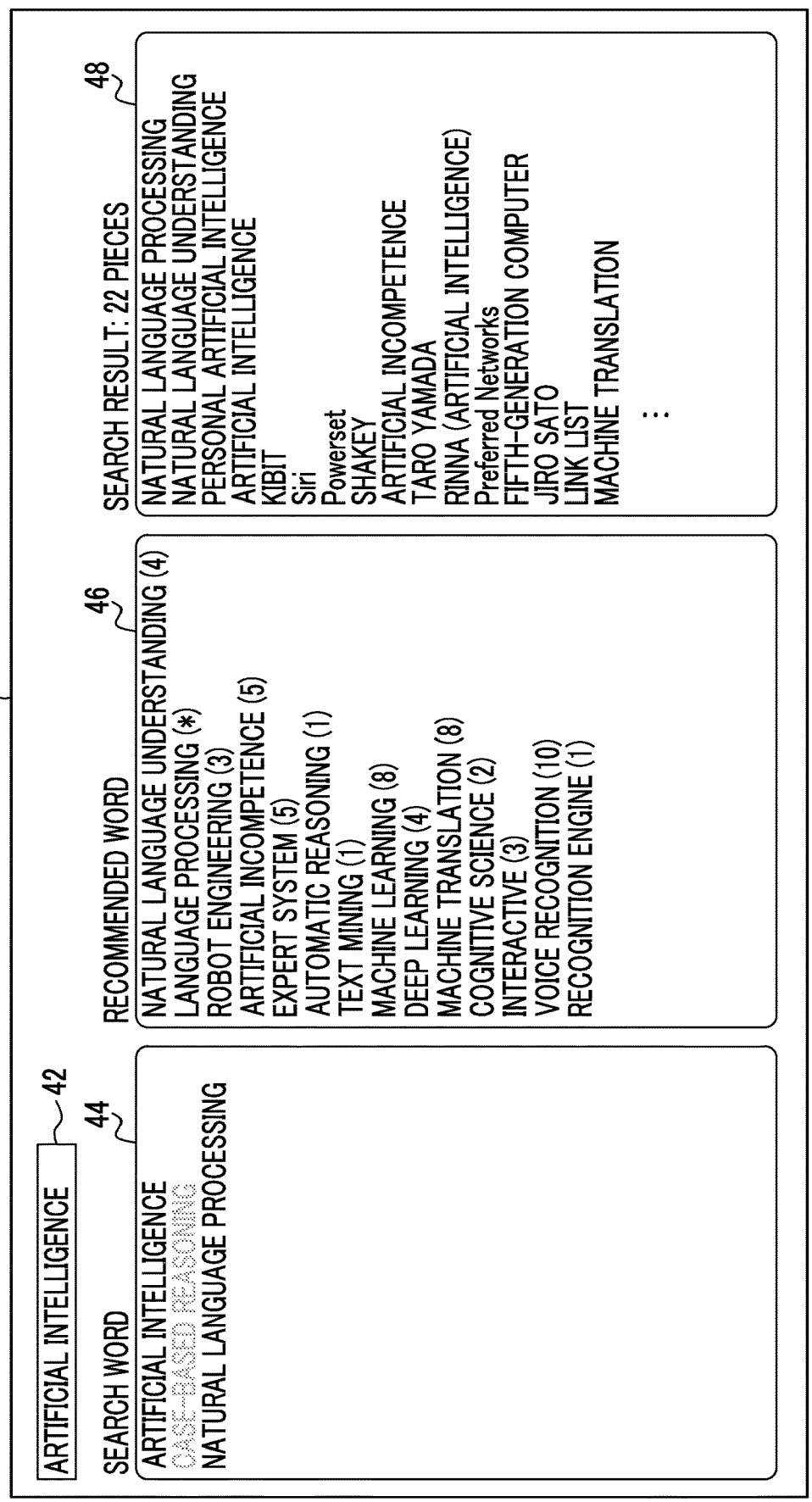
FIG. 18 is a diagram showing an example of the search screen.
Figure 19:
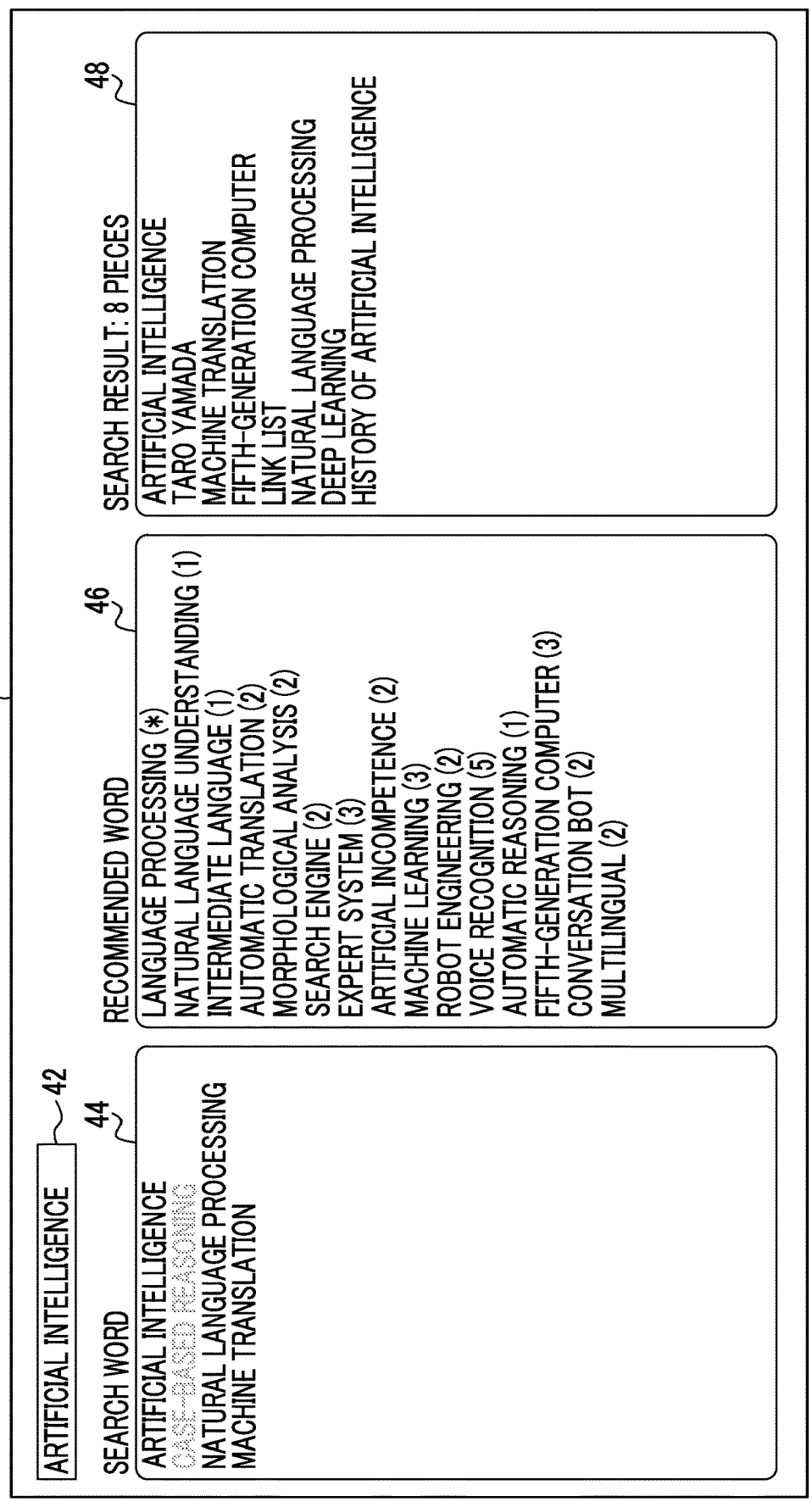
FIG. 19 is a diagram showing an example of the search screen.
Figure 20:
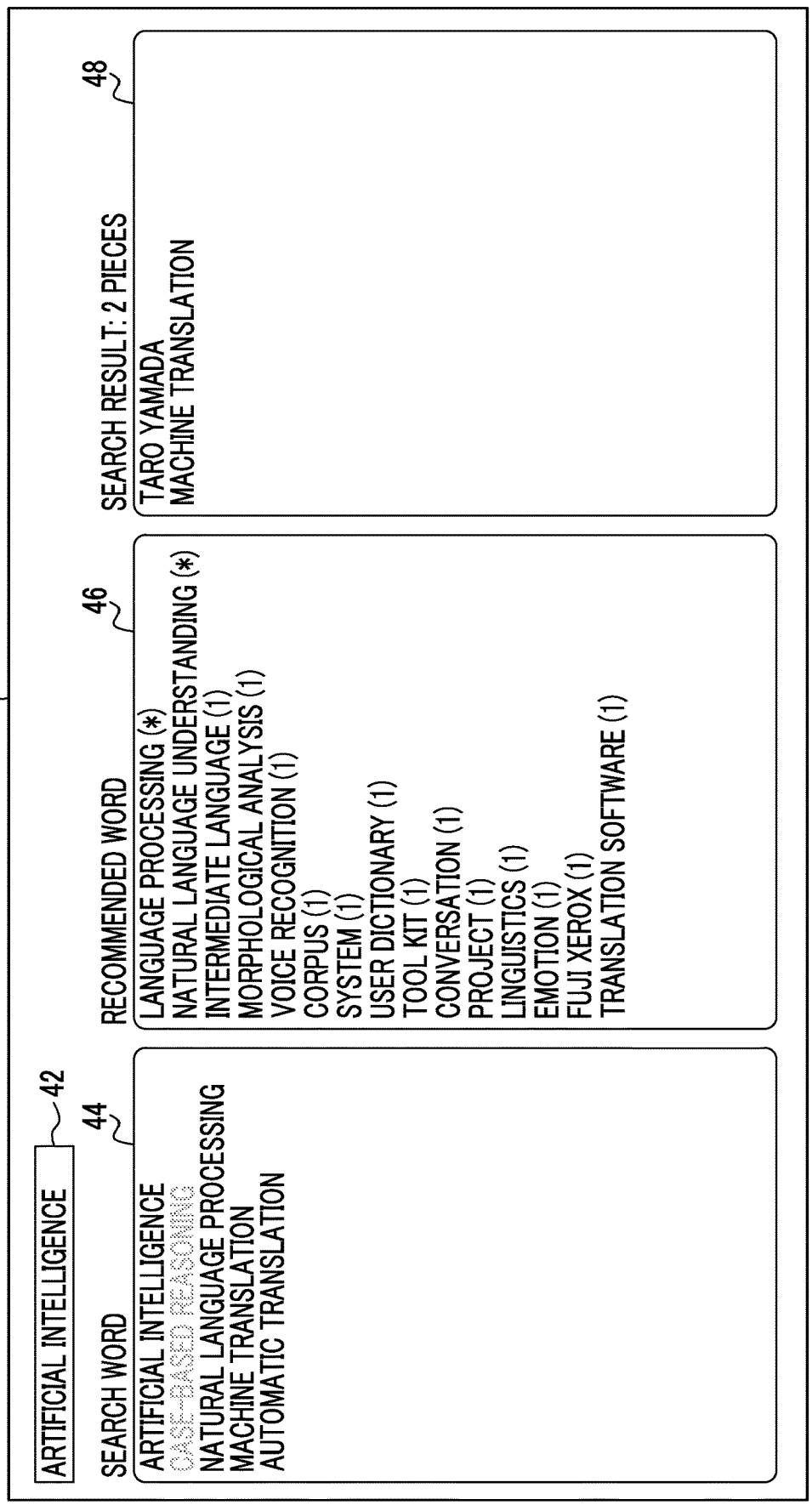
FIG. 20 is a diagram showing an example of the search screen.

Here, a specific example of the operation of the search process will be described. For example, in a case where the user selects the recommended word "natural language processing" in the state of FIG. 15, the search result is narrowed down to 22 pieces, as shown in FIG. 18. Next, in a case where the user determines that there are too many search results by referring to 22 search results and selects the recommended word "machine translation" as shown in FIG. 19, the search results are narrowed down to eight pieces. Next, in a case where the user determines that there is no desired content information by referring to eight search results and selects the recommended word "automatic translation" as shown in FIG. 20, the search results are narrowed down to two pieces.

Figure 21:
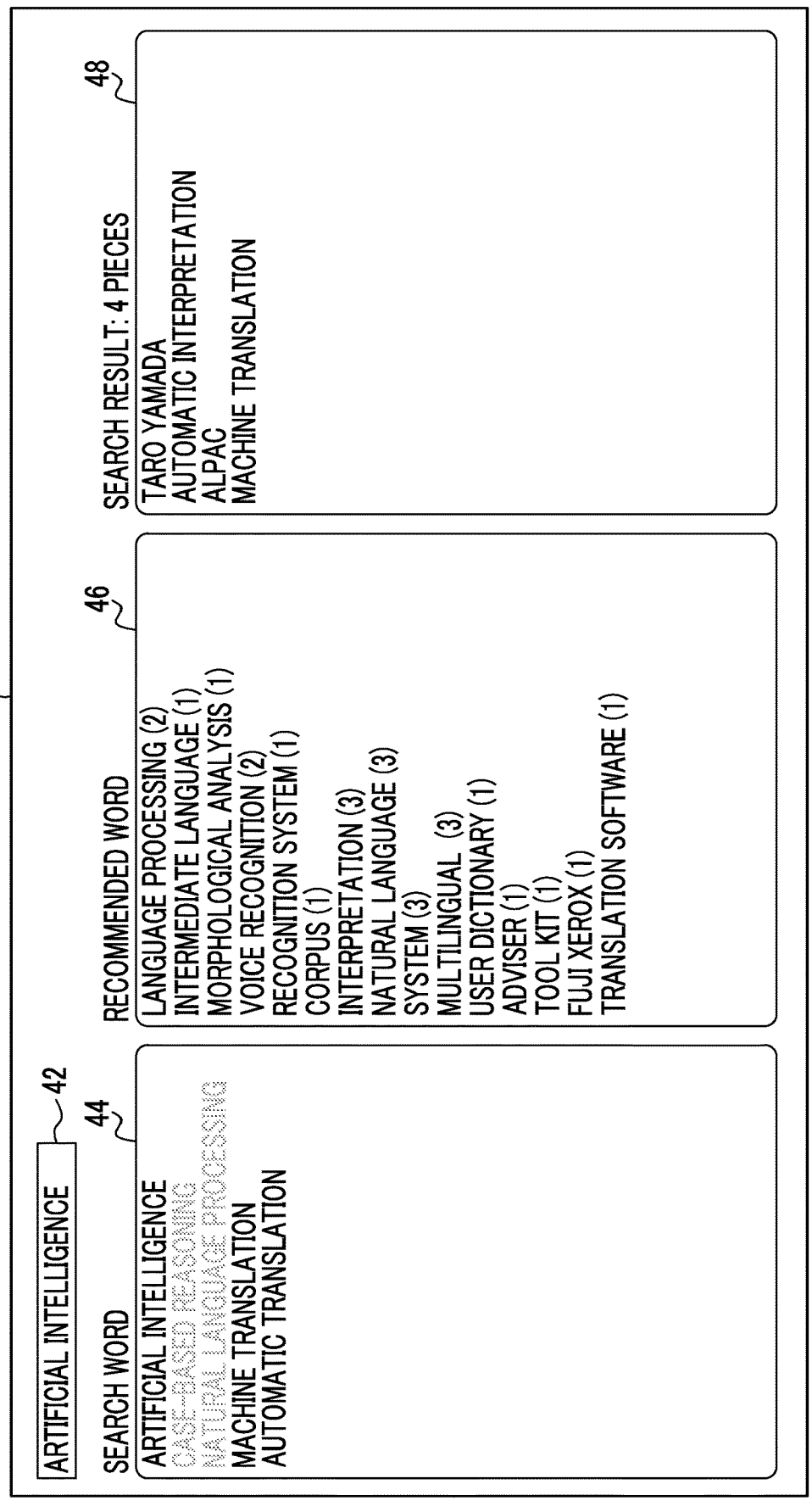
FIG. 21 is a diagram showing an example of the search screen.
Figure 22:
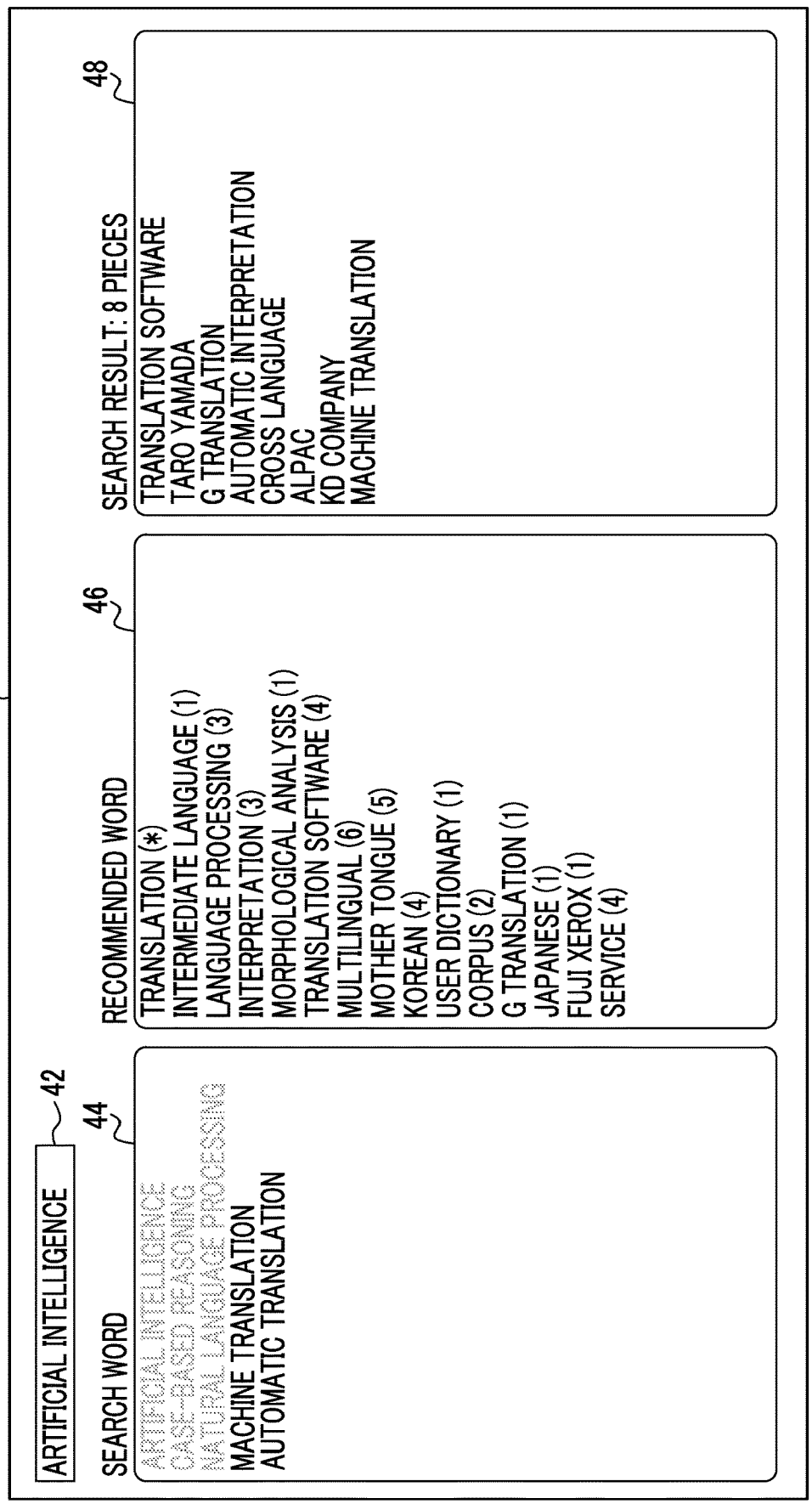
FIG. 22 is a diagram showing an example of the search screen.

Then, in a case where the user determines that there is no desired content information by referring to two search results and designates the search word "natural language processing" as the stored search word as shown in FIG. 21, the number of search results is four. In a case where the user determines that there is no desired content information by referring to four search results and designates the search word "artificial intelligence" as the stored search word as shown in FIG. 22, the number of search results is eight. Next, in a case where the user determines that there are too many search results by referring to eight search results, reselects and restores the stored search word "natural language processing" as a search word as shown in FIG. 23, the number of search results is three. Then, the user recognizes, for example, "translation software" out of the three search results, as content information to be desired to be searched.

As described above, by reselecting the "natural language processing" used as a search word in the past by a simple operation, the content information is searched with search words of a new combination including the search word used in the past. Therefore, it easily reaches the desired content information.

Further, as shown in FIGS. 13 to 21, the search words are displayed in the order in which the search words are added, in the search word display region 44. Further, as shown in FIGS. 15 to 21, in a case where a stored search word is received, the stored search word is displayed in a storage state, without the position where the stored search word is displayed being changed. Therefore, it is easy to recognize the operation history of the user.

Although the present invention has been described with reference to each exemplary embodiment, the present invention is not limited to the scope described in each exemplary embodiment. Various modifications or improvements can be added to each exemplary embodiment within the scope without departing from the gist of the present invention, and modified or improved aspects are also included in the technical scope of the present invention.

Further, for example, the information processing shown in FIGS. 4 to 10 may be realized by hardware such as an application specific integrated circuit (ASIC) or the like. In this case, the processing speed can be increased as compared with the case of realizing with software.

In each of the exemplary embodiments, an aspect in which the search processing program is installed in the storage unit 20 has been described, but the present invention is not limited to this. The search processing program according to the present exemplary embodiment may be provided in a form recorded in a computer readable storage medium. For example, the search processing program according to the present exemplary embodiment may be provided in a form in which the search processing program is recorded on an optical disk such as a compact disc (CD)-ROM and a digital versatile disc (DVD)-ROM, or a semiconductor memory such as a universal serial bus (USB) memory and a memory card. Further, the search processing program according to the present exemplary embodiment may be acquired from an external device through the network N connected to the communication unit 18.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A search apparatus comprising:
 a display;
 a non-transitory storage medium which stores at least a word table; and
 a hardware processor coupled to the non-transitory storage medium and the display and configured at least to:
 in a case of displaying, on the display, a search result of content information searched with a selected search word, performs control of the display to display recommended words corresponding to the search word;
 in a case of displaying a search result of content information searched by adding a selected recommended word, which is selected from the recommended words, as a search word, performs control of the display to display the selected recommended word in a search word display region at which the search words are displayed, and the recommended words corresponding to the selected search word and the added search word are displayed;
 update the word table which comprises the selected search word and the selected recommended word;
 receive a stored search word from the word table, out of the selected search word and the added search word, the stored search word being displayed in a storage state indicating that the stored search word is not used for search of the content information but is capable of being reselected; and
 perform, in a case where the processor is configured to receive the stored search word, performs control of the display to display the stored search word in the storage state, and the recommended words corresponding to search words other than the stored search word are displayed.

2. The search apparatus according to claim 1,
 wherein in a case where the processor is configured to receive the stored search word, the processor is further configured to control the display to display a search result of content information searched with search words other than the stored search word.

3. The search apparatus according to claim 2,
 wherein in a case where recommended words not included in a current search result or recommended words included in all current search results are selected from among the recommended words, the processor is further configured to add the selected recommended words as search words, and search words other than the added search words are in the storage state.

4. The search apparatus according to claim 3,
 wherein the processor is further configured to perform control that the number of pieces of content information searched in a case where the content information is searched by adding the recommended words as the search words is displayed on the display for each of the recommended words, and update the number of pieces of content information searched in a case where the content information is searched, by adding recommended words corresponding to search words other than the stored search words as search words, in a case where the reception unit receives the stored search words.

5. The search apparatus according to claim 3,
 wherein in a case where a cursor for selecting the recommended words is displayed at a position of a certain recommended word among the recommended words, the processor is further configured to control the display to display a search result of content information searched by adding the certain recommended word as a search word.

6. The search apparatus according to claim 2,
 wherein the processor is further configured to perform control that the number of pieces of content information searched in a case where the content information is searched by adding the recommended words as the search words is displayed on the display for each of the recommended words, and update the number of pieces of content information searched in a case where the content information is searched, by adding recommended words corresponding to search words other than the stored search words as search words, in a case where the reception unit receives the stored search words.

7. The search apparatus according to claim 2,
 wherein in a case where a cursor for selecting the recommended words is displayed on the display at a position of a certain recommended word among the recommended words, the the processor is further configured to control the display to display a search result of content information searched by adding the certain recommended word as a search word.

8. The search apparatus according to claim 1,
wherein in a case where recommended words not included in a current search result or recommended words included in all current search results are selected from among the recommended words, the processor is further configured to add the selected recommended words as search words, and search words other than the added search words are in the storage state.

9. The search apparatus according to claim 8,
wherein the processor is further configured to perform control that the number of pieces of content information searched in a case where the content information is searched by adding the recommended words as the search words is displayed on the display for each of the recommended words, and update the number of pieces of content information searched in a case where the content information is searched, by adding recommended words corresponding to search words other than the stored search words as search words, in a case where the reception unit receives the stored search words.

10. The search apparatus according to claim 8,
wherein in a case where a cursor for selecting the recommended words is displayed at a position of a certain recommended word among the recommended words, the processor is further configured to control the display to display a search result of content information searched by adding the certain recommended word as a search word.

11. The search apparatus according to claim 1,
wherein the processor is further configured to perform control that the number of pieces of content information searched in a case where the content information is searched by adding the recommended words as the search words is displayed on the display for each of the recommended words, and update the number of pieces of content information searched in a case where the content information is searched, by adding recommended words corresponding to search words other than the stored search words as search words, in a case where the reception unit receives the stored search words.

12. The search apparatus according to claim 11,
wherein in a case where a cursor for selecting the recommended words is displayed at a position of a certain recommended word among the recommended words, the processor is further configured to control the display to display a search result of content information searched by adding the certain recommended word as a search word is displayed.

13. The search apparatus according to claim 1,
wherein in a case where a cursor for selecting the recommended words is displayed on the display at a position of a certain recommended word among the recommended words, the processor is further configured to perform control of the display to display a search result of content information searched by adding the certain recommended word as a search word.

14. The search apparatus according to claim 13,
Wherein processor is further configured to control the display to display the certain recommended word in a region at which the search words are displayed on the display, during a period when the cursor is located in the certain recommended word.

15. The search apparatus according to claim 1,
wherein processor is further configured to control the display to display a manner in which the selected recommended word moves to the search word display region so as to be recognizable.

16. The search apparatus according to claim 1,
wherein the processor is further configured to receive a deletion search word to be deleted from the search words displayed on the display in the search word display region, and
wherein in a case where the processor is configured to receive the deletion search word, processor is further configured to delete the deletion search word from the search word display region and to control the display to display a search result of content information searched with search words other than the deletion search word.

17. The search apparatus according to claim 1,
wherein processor is further configured to receive a negative search word which is a search word not included in the search result of the content information, from the search words displayed on the display in the search word display region, and
wherein in a case where the processor is configured to receive the negative search word, the processor is further configured to control the display to display a search result of content information searched such that the negative search word is not included.

18. The search apparatus according to claim 1,
wherein the processor is further configured to control the display to display the search words in the search word display region in an order in which the search words are added.

19. The search apparatus according to claim 18,
wherein in a case where the processor is configured to receive the stored search word, the processor is further configured to control the display to display the stored search word in the storage state without changing a position.

20. The search apparatus according to claim 1, wherein the processor is configured to update the word table comprises: update a corresponding storage state for each of entries of the word table, and the entries comprise the selected search word and the selected recommended word.

21. A non-transitory computer readable medium storing a search program causing a computer to function as each unit of the search apparatus, the computer comprising a display, a non-transitory storage medium which stores at least a word table, and a hardware processor coupled to the non-transitory storage medium and the display and configured to execute the search programing to:
in a case of displaying, on the display, a search result of content information searched with a selected search word, performs control of the display to display recommended words corresponding to the search word;
in a case of displaying a search result of content information searched by adding a selected recommended word, which is selected from the recommended words, as a search word, performs control of the display to display the selected recommended word in a search word display region at which the search words are displayed, and the recommended words corresponding to the selected search word and the added search word are displayed;
update the word table which comprises the selected search word and the selected recommended word;
receive a stored search word from the word table, out of the selected search word and the added search word, the stored search word being displayed in a storage state indicating that the stored search word is not used for search of the content information but is capable of being reselected; and perform, in a case where the processor is configured to receive the stored search word, performs control of the display to display the stored search word in the storage state, and the recommended words corresponding to search words other than the stored search word are displayed.

* * * * *